US009600560B2

(12) United States Patent
Hirate

(10) Patent No.: US 9,600,560 B2
(45) Date of Patent: Mar. 21, 2017

(54) SEARCH KEYWORD AND CATEGORY ASSOCIATION APPARATUS, SEARCH KEYWORD AND CATEGORY ASSOCIATION METHOD, SEARCH KEYWORD AND CATEGORY ASSOCIATION PROGRAM AND RECORDING MEDIUM

(75) Inventor: Yu Hirate, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 405 days.

(21) Appl. No.: 14/240,084

(22) PCT Filed: Apr. 2, 2012

(86) PCT No.: PCT/JP2012/058892
§ 371 (c)(1),
(2), (4) Date: Feb. 21, 2014

(87) PCT Pub. No.: WO2013/031274
PCT Pub. Date: Mar. 7, 2013

(65) Prior Publication Data
US 2014/0207773 A1    Jul. 24, 2014

(30) Foreign Application Priority Data
Aug. 31, 2011 (JP) ................................ 2011-189428

(51) Int. Cl.
*G06F 17/30* (2006.01)
(52) U.S. Cl.
CPC .... *G06F 17/30598* (2013.01); *G06F 17/3061* (2013.01)

(58) Field of Classification Search
CPC ...................................................... G06F 17/30
See application file for complete search history.

(56) References Cited

U.S. PATENT DOCUMENTS

2005/0222987 A1*  10/2005  Vadon ............... G06F 17/30997
2006/0288000 A1   12/2006  Gupta
2009/0083230 A1    3/2009  Watanabe et al.
2012/0239679 A1    9/2012  Gupta

FOREIGN PATENT DOCUMENTS

JP    2001-249933 A    9/2001
JP    2006-92235 A     4/2006
(Continued)

OTHER PUBLICATIONS

Translation of International Preliminary Report on Patentability dated Mar. 13, 2014 issued in Application No. PCT/JP2012/058892.
(Continued)

*Primary Examiner* — Robert Beausoliel, Jr.
*Assistant Examiner* — Hau H Hoang
(74) *Attorney, Agent, or Firm* — Sughrue Mion, PLLC

(57) ABSTRACT

To associate a keyword with a category having a high degree of relevance with the keyword. An association apparatus comprises an acquisition means that acquires the number of times when each of a plurality of categories of a search target is designated as a search condition together with a keyword, and a registration means that registers category information indicating the category for which the number of times acquired by the acquisition means is a threshold or more, and the keyword in an associated manner.

12 Claims, 16 Drawing Sheets

(56) References Cited

FOREIGN PATENT DOCUMENTS

| JP | 2007-122290 A | 5/2007 |
|---|---|---|
| JP | 2008-544377 A | 12/2008 |
| JP | 2009-43263 A | 2/2009 |
| JP | 2009-80577 A | 4/2009 |

OTHER PUBLICATIONS

Gurunavi, Inc., "Gurunavi Party Gourmet Information Searching Site", [online], [searched on Aug. 3, 2011], Internet <URL:http://www.gnavi.co.jp/>.

* cited by examiner

FIG.2
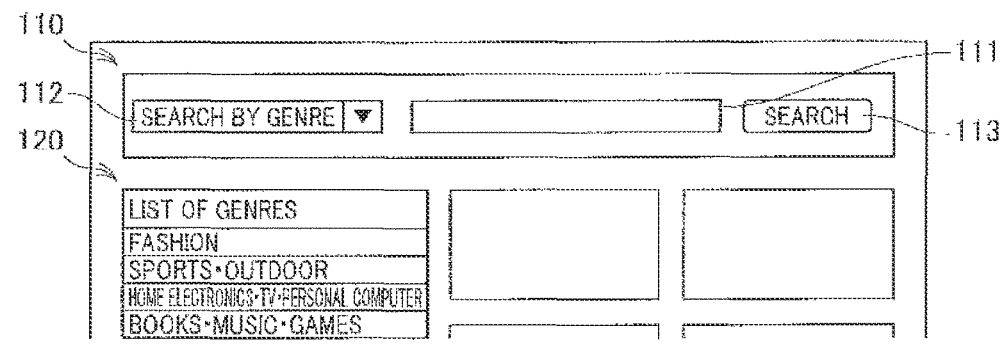
(a)
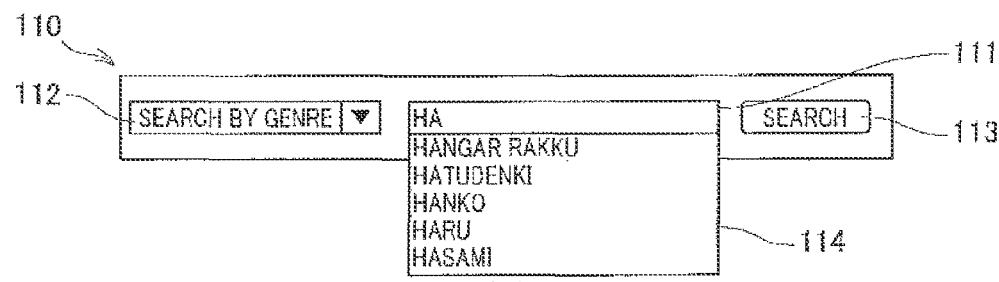
(b)
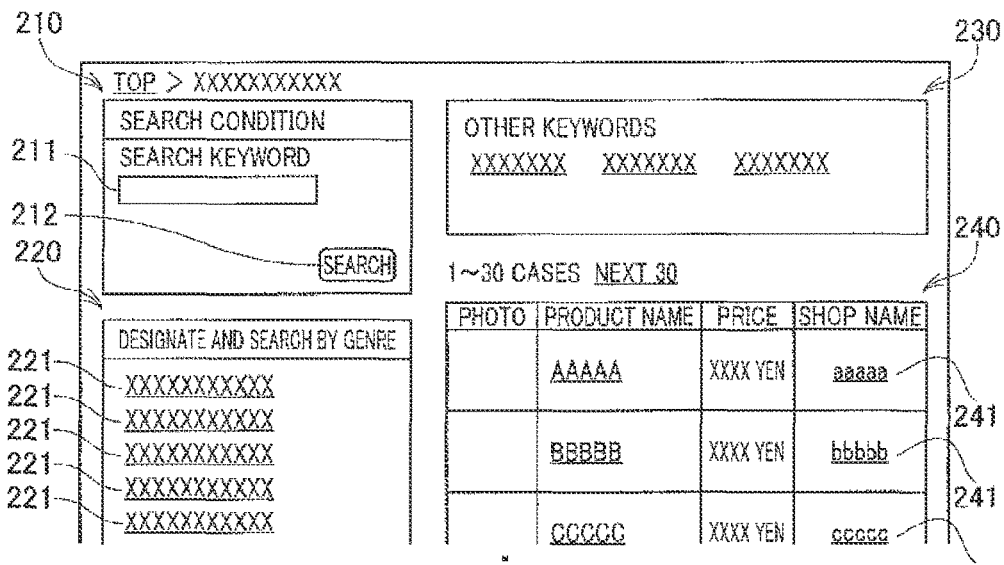
(c)

FIG.4
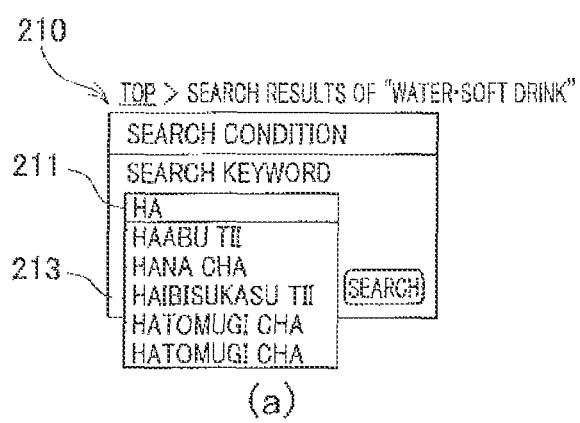
(a)
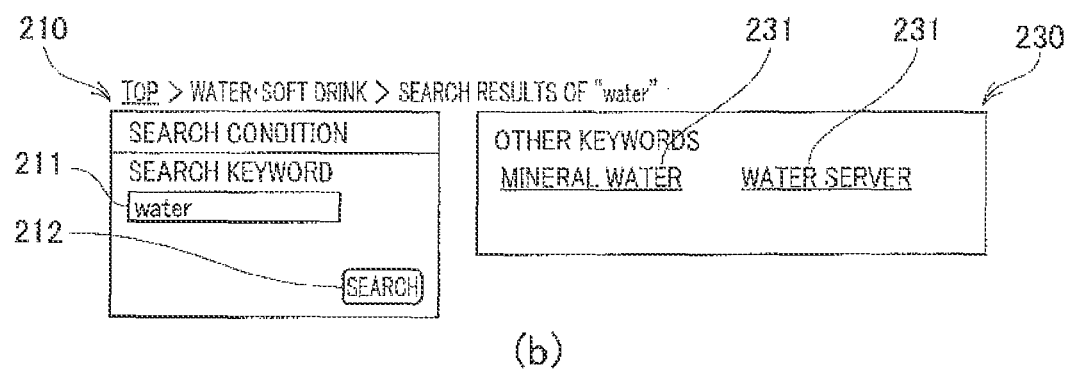
(b)

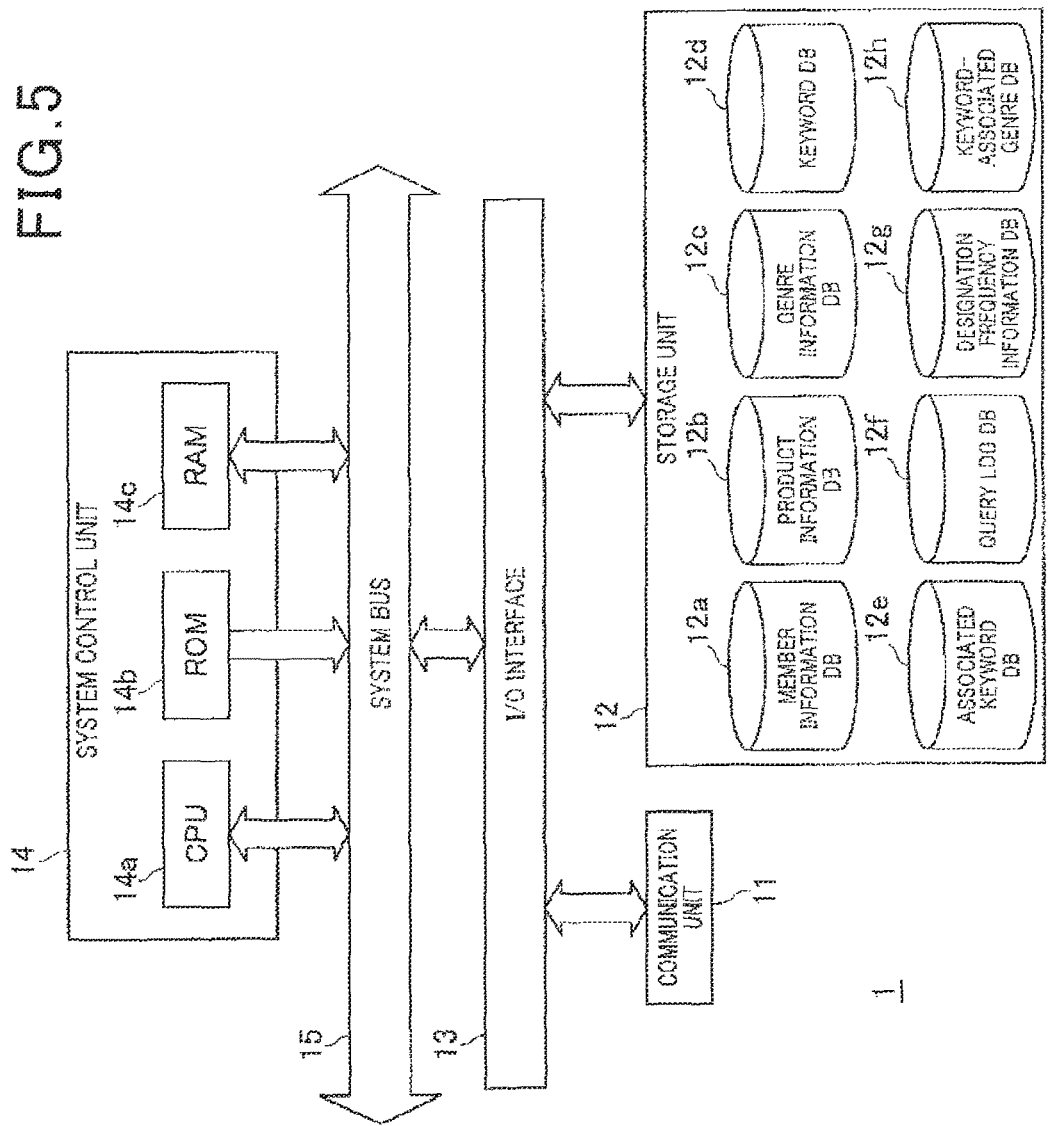

FIG.6

MEMBER INFORMATION DB 12a

| USER ID |
|---|
| PASSWORD |
| NICKNAME |
| NAME |
| DATE OF BIRTH |
| SEX |
| ZIP CODE |
| ADDRESS |
| PHONE NUMBER |
| E-MAIL ADDRESS |
| NUMBER OF HOLDING POINTS |
| . . . |

(a)

PRODUCT INFORMATION DB 12b

| PRODUCT ID |
|---|
| SHOP ID |
| PRODUCT CODE |
| GENRE ID |
| PRODUCT NAME |
| PRODUCT IMAGE URL |
| PRODUCT EXPLANATION |
| PRODUCT PRICE |
| . . . |

(b)

GENRE INFORMATION DB 12c

| GENRE ID |
|---|
| GENRE NAME |
| LEVEL |
| PARENT GENRE ID |
| CHILD GENRE ID LIST |
| . . . |

(c)

KEYWORD DB 12d

| KEYWORD |
|---|
| KEYWORD |
| . . . |

(d)

ASSOCIATED KEYWORD DB 12e

| KEYWORD |
|---|
| ASSOCIATED KEYWORDR |
| . . . |

(e)

QUERY LOG DB 12f

| RECEPTION TIME/DATE |
|---|
| SEARCH KEYWORD |
| GENRE ID |
| SEX |
| AGE |
| PREFECTURE |
| . . . |

(f)

DESIGNATION FREQUENCY INFORMATION DB 12g

| SEARCH KEYWORD | |
|---|---|
| GENRE ID | NUMBER OF DESIGNATIONS |
| GENRE ID | NUMBER OF DESIGNATIONS |
| GENRE ID | NUMBER OF DESIGNATIONS |
| . . . | . . . |

(g)

KEYWORD-ASSOCIATED GENRE DB 12h

| SEARCH KEYWORD |
|---|
| GENRE ID |
| RELEVANCE SCORE |
| . . . |

(h)

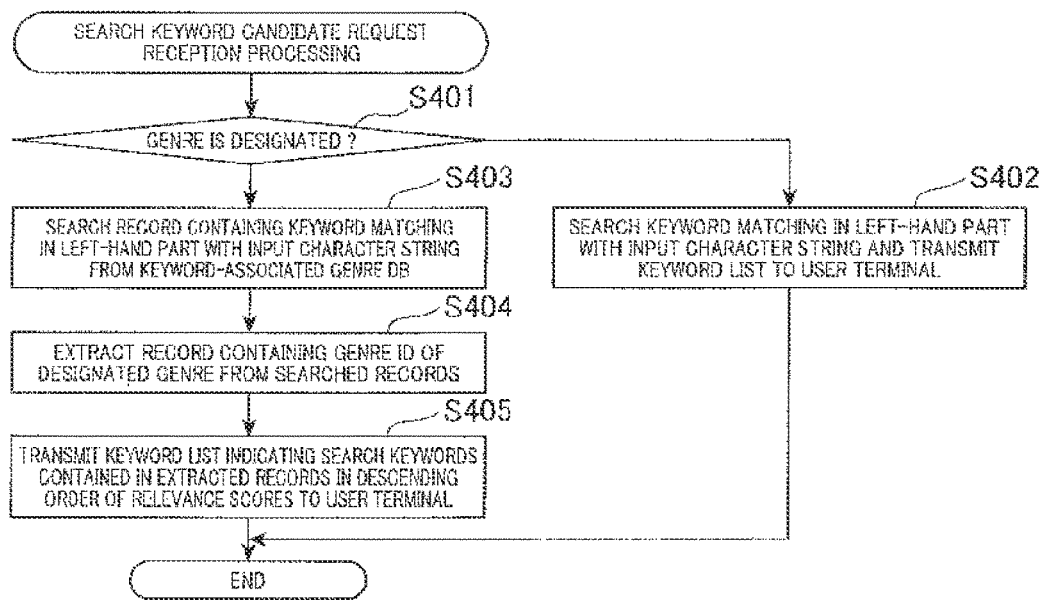

SEARCH KEYWORD AND CATEGORY ASSOCIATION APPARATUS, SEARCH KEYWORD AND CATEGORY ASSOCIATION METHOD, SEARCH KEYWORD AND CATEGORY ASSOCIATION PROGRAM AND RECORDING MEDIUM

CROSS REFERENCE TO RELATED APPLICATIONS

This application is a National Stage of International Application No. PCT/JP2012/058892 filed Apr. 2, 2012, claiming priority based on Japanese Patent Application No. 2011-189428 filed Aug. 31, 2011, the contents of all of which are incorporated herein by reference in their entirety.

TECHNICAL FIELD

The present invention relates to a technical field of a system for acquiring a keyword or a category of a search target as a search condition and for making a search based on the search condition.

BACKGROUND ART

There is conventionally known a search system for receiving a search condition designated by a user from a terminal apparatus via a network and making a search based on the designated search condition. Information designatable as the search condition is a keyword, a category of a search target, or the like. The category of a search target indicates a range containing similar objects when objects to be searched are classified according to a preset reference, for example. The category is genre, category, price range, region, or the like, for example, according to each search system.

For example, Non-Patent Document 1 discloses a technique for searching a restaurant therein. The technique employs categories of restaurants such as region where a restaurant is present, business form of a restaurant, price range for eating, and the like. When the user designates a keyword as a search condition, restaurants whose names or explanations contain the keyword are searched, for example. Then, a list of searched restaurants is displayed on the screen. A list of categories to which the searched restaurants belong is displayed on the screen. When the user selects any category among the categories displayed in the list, search refinement is made on the restaurants by the selected category. When the list of categories is displayed, the categories are preferentially displayed in descending order of the number of restaurants searched by the designated keyword. That is, as a category has more restaurants, the category is displayed to be more easily searched by the user.

CITATION LIST

Non-Patent Document

Non-Patent Document 1: GURUNAVI, INC., "GURUNAVI Party Gourmet Information Searching Site", [online], [searched on Aug. 3, 2011], Internet <URL:http://www.g-navi.co.jp/>

SUMMARY OF INVENTION

Technical Problem to be Solved by the Invention

However, a category to which many objects searched by a keyword belong is not necessarily a category having a high degree of relevance with the keyword. This will be described assuming a product as a search target. It is assumed that product genres are beverage and perfume, for example. It is assumed herein that a keyword designated as a search condition is "水 (water)". Beverage is to be drunk for hydration. The genres of beverage includes mineral water, or water itself as a product. On the other hand, perfume is more focused on its application for perfuming than on being liquid. If a product of perfume is to be searched, not "水 (water)" but "香水 (perfume)" may be designated as a keyword. Thus, it is reasonable that beverage has a higher degree of relevance with "水 (water)" than perfume. The characters of "香水 (perfume)" are contained in the product name or explanation of perfume in many cases. Thus, more products of perfume may be searched by the keyword "水 (water)" than the products of beverage.

When "水 (water)" is designated as a search condition, as in the technique described in Non-Patent Document 1, a list of genres of products is assumed to be displayed. At this time, if "water" is not associated with beverage as a keyword and a genre having a high degree of relevance therebetween, the genres of perfume may be preferentially displayed to the genres of beverage. The genres of perfume are preferentially displayed, and thus the user may not easily search a genre of beverage regarded as having a high degree of relevance with the keyword "water" from the list.

As described above, if a relevance between a keyword and a category is not considered, user's convenience may be lowered. However, it is complicated to manually extract and associate a pair of keyword and category having a high degree of relevance therebetween. With the manual operation, a determination as to whether the relevance is high depends on an individual subjective view, and thus a pair of keyword and category having a high degree of relevance therebetween is not necessarily extracted appropriately.

The present invention has been made in terms of the above problems, and it is an object thereof to provide an association apparatus capable of associating a keyword and a category having a high degree of relevance with the keyword, an association method, an association program and a recording medium.

Solution to the Problem

In order to achieve the above described problems, an invention described in claim 1 is characterized in that an association apparatus comprising: an acquisition means that acquires the number of times when each of a plurality of categories of a search target is designated as a search condition together with a certain keyword; and a registration means that registers category information indicating the category for which the number of times acquired by the acquisition means is a threshold or more, and the certain keyword in an associated manner.

According to the invention, a category which is designated as a search condition together with a keyword many times may be regarded as having a high degree of relevance with the keyword, and thus the keyword can be associated with the category having a high degree of relevance with the keyword.

An invention described in claim 2 is characterized in that the association apparatus according to claim 1, wherein when a degree of variation of the number of times acquired by the acquisition means in the plurality of categories exceeds a variably-set degree, the registration means makes the registration.

According to the invention, since when the number of times when a category is designated as a search condition together with a keyword varies in a plurality of categories, the keyword can be associated with the category, a category designated more times than other categories in the categories can be associated with the keyword.

An invention described in claim 3 is characterized in that the association apparatus according to claim 1 or claim 2, wherein when a plurality of sub-categories are set as the categories belonging to the category indicated by the category information registered by the registration means in association with the certain keyword, the acquisition means acquires the number of times when each of the plurality of sub-categories is designated as a search condition together with the certain keyword, and the registration means registers category information indicating the sub-category for which the acquired number of times is a threshold or more, and the certain keyword in an associated manner.

According to the invention, when the categories are hierarchically defined, a category having a high degree of relevance with a keyword can be hierarchically associated.

An invention described in claim 4 is characterized in that the association apparatus according to any one of claims 1 to 3, wherein the registration means registers the category information of the category for which the number of times acquired by the acquisition means is a threshold determined depending on the number of categories or more, and the certain keyword in an associated manner.

According to the invention, a category having a high degree of relevance with a keyword can be appropriately extracted depending on the number of categories.

An invention described in claim 5 is characterized in that the association apparatus according to any one of claims 1 to 4, wherein the search target is a transaction target to be dealt in a commercial transaction, and the acquisition means acquires the number of times when a deal of the transaction target is done based on the transaction target searched under the search condition for the number of times when the certain keyword is designated as a search condition together with the category.

According to the invention, a keyword and a category, which have a higher degree of relevance therebetween, can be associated with each other, in case that the search target is a transaction target, than in case that the keyword is only designated as search conditions.

An invention described in claim 6 is characterized in that the association apparatus according to any one of claims 1 to 5, wherein the acquisition means acquires the number of times when each of the plurality of categories is designated together with the certain keyword per attribute information of a user who designates, and the registration means registers the category information indicating the category for which the number of times acquired by the acquisition means is a threshold or more, and the attribute information as well as the certain keyword in an associated manner.

According to the invention, association suitable for an attribute of the user designating a search condition can be performed.

An invention described in claim 7 is characterized in that the association apparatus according to any one of claims 1 to 6, further comprising: a keyword acquisition means that acquires a keyword designated as a search condition; and a display order determination means that determines, based on the number of times acquired by the acquisition means, a display order of the category by a category display means that displays the category registering the category information therein by the registration means in association with a keyword acquired by the keyword acquisition means from among the plurality of categories in a designatable manner.

According to the invention, a category designatable for refinement from among the search targets searched by a user-designated keyword, which has a high degree of relevance with the designated keyword, can be preferentially displayed. Thus, the user can easily search a category to be designated as a search condition.

An invention described in claim 8 is characterized in that the association apparatus according to any one of claims 1 to 7, further comprising: a character string acquisition means that acquires a character string input in a keyword input column as a search condition together with the category information of the category designated as a search condition; and a keyword determination means that determines a keyword displayed by a keyword display means that displays a keyword containing a character string acquired by the character string acquisition means as a search condition in a designatable manner, and makes a determination such that a keyword registered by the registration means in association with the category information acquired by the character string acquisition means is preferentially displayed.

According to the invention, when a keyword containing a user-input character string is displayed as a candidate of the keyword to be designated as a search condition, a keyword having a high degree of relevance with a designated category can be preferentially displayed. Thus, the user can easily designate a keyword.

An invention described in claim 9 is characterized in that the association apparatus according to any one of claims 1 to 8, further comprising: a keyword acquisition means that acquires a keyword designated as a search condition; an evaluation value acquisition means that acquires an evaluation value for determining a display order as a search result, the evaluation value being of a search target searched based on a keyword acquired by the keyword acquisition means; and an evaluation value change means that increases the evaluation value of a search target belonging to the category indicated by the category information registered by the registration means in association with a keyword acquired by the keyword acquisition means among the searched search targets relative to the evaluation value of other search target.

According to the invention, a display order as a search result of a search target belonging to a category having a high degree of relevance with a designated keyword can be increased. Thus, the user can easily search a search target having a high degree of relevance with the keyword from the search results.

An invention described in claim 10 is characterized in that an association method performed by a computer, comprising: an acquisition step of acquiring the number of times when each of a plurality of categories of a search target is designated as a search condition together with a certain keyword; and a registration step of registering category information indicating the category for which the number of times acquired by the acquisition means is a threshold or more, and the keyword in an associated manner.

An invention described in claim 11 is characterized in that an association program for causing a computer to function as: an acquisition means that acquires the number of times when each of a plurality of categories of a search target is designated as a search condition together with a certain keyword; and a registration means that registers category information indicating the category for which the number of times acquired by the acquisition means is a threshold or more, and the certain keyword in an associated manner.

An invention described in claim 12 is characterized in that a recording medium computer-readably recording an association program therein, the program causing a computer to function as: an acquisition means that acquires the number of times when each of a plurality of categories of a search target is designated as a search condition together with a keyword; and a registration means that registers category information indicating the category for which the number of times acquired by the acquisition means is a threshold or more, and the certain keyword in an associated manner.

Effects of the Invention

According to the present invention, a category which is designated as a search condition together with a keyword many times may be considered as a category having a high degree of relevance with the keyword, and thus the keyword can be associated with the category having a high degree of relevance with the keyword.

BRIEF DESCRIPTION OF THE DRAWINGS

FIG. 2(*a*) is a figure illustrating exemplary display of the top page of an electronic mall.

FIG. 2(*b*) is a figure of exemplary display of a search keyword candidate display region 114.

FIG. 2(*c*) is an exemplary display of a search result page.

FIG. 4(*a*) is a figure illustrating exemplary display of keywords in a search keyword candidate display region 213.

FIG. 4(*b*) is a figure illustrating exemplary display of associated keyword links 231 in an associated keyword display region 230.

FIG. 5 is a block diagram illustrating an exemplary outline structure of an electronic mall server 1 according to the embodiment.

FIG. 6(*a*) is a figure illustrating exemplary contents registered in a member information DB 12*a*.

FIG. 6(*b*) is a figure illustrating exemplary contents registered in a product information DB 12*b*.

FIG. 6(*c*) is a figure illustrating exemplary contents registered in a genre information DB 12*c*.

FIG. 6(*d*) is a figure illustrating exemplary contents registered in a keyword DB 12*d*.

FIG. 6(*e*) is a figure illustrating exemplary contents registered in an associated keyword DB 12*e*.

FIG. 6(*f*) is a figure illustrating exemplary contents registered in a query log DB 12*f*.

FIG. 6(*g*) is a figure illustrating exemplary contents registered in a designation frequency information DB 12*g*.

FIG. 6(*h*) is a figure illustrating exemplary contents registered in a keyword-associated genre information DB 12*h*.

FIG. 15 is a flowchart illustrating exemplary processings in a search keyword candidate request reception processing of the system control unit 14 in the electronic mall server 1 according to the embodiment.

FIG. 16 is a figure illustrating exemplary contents registered in a purchase history DB 12*i*.

MODES FOR CARRYING OUT THE INVENTION

An embodiment according to the present invention will be describe below in detail with reference to the drawings. The embodiment described below is where the present invention is applied to a shopping system.

[1. Structure and Functional Outline of Shopping System]
[1-1. Structure of Shopping System]

Figure 1:
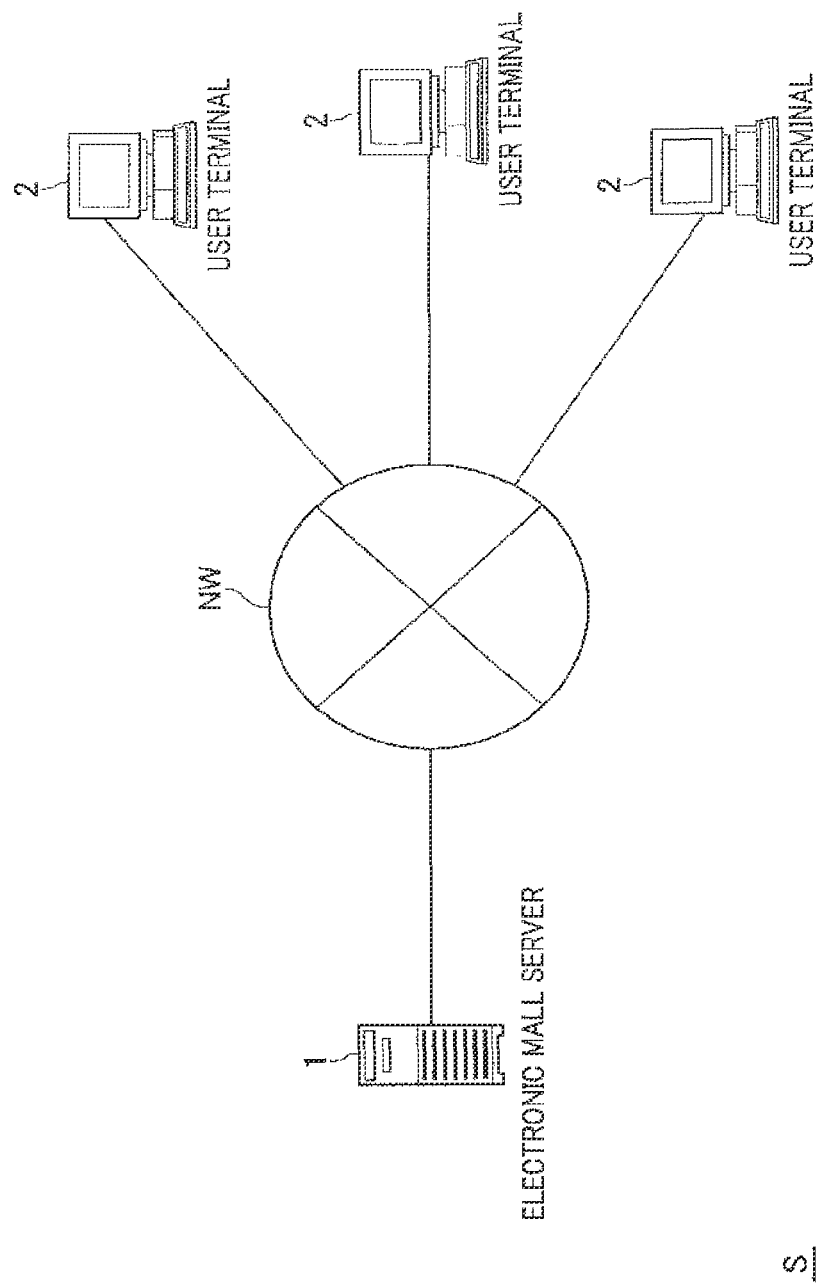
FIG. 1 is a figure illustrating an exemplary outline structure of a shopping system S according to one embodiment.

A structure of a shopping system S according to the present embodiment will be first described with reference to FIG. 1. FIG. 1 is a figure illustrating an exemplary outline structure of the shopping system S according to the present embodiment.

As illustrated in FIG. 1, the shopping system S includes an electronic mall server 1 and a plurality of user terminals 2. The electronic mall server 1 and each user terminal 2 can mutually exchange data via a network NW or by use of a communication protocol such as TCP/IP. The network NW is constructed of Internet, a dedicated communication line (such as CATV (Community Antenna Television) line), a mobile communication network (including a base station or the like), a gateway, or the like, for example.

The electronic mall server 1 (exemplary association apparatus according to the present invention) is a server apparatus that performs various processings for the electronic mall from which products can be purchased. A user can purchase a desired product from a desired shop by use of the electronic mall. The electronic mall server 1 transmits a Web page of the electronic mall or performs a processing of searching or purchasing a product, for example, in response to a request from the user terminal 2.

The user terminal 2 is a terminal apparatus of a user utilizing the electronic mall. The user terminal 2 accesses the electronic mall server 1 in response to a user operation, thereby receiving and displaying a Web page from the electronic mall server 1. The user terminal 2 comprises a CPU, a memory, an operation unit for receiving a user operation, a display for displaying information on a display screen, and the like. The user terminal 2 incorporates software such as browser and e-mail client therein. The user terminal 2 employs a portable information terminal such as personal computer, PDA (Personal Digital Assistance) or Smartphone, a cell phone, or the like, for example.

[1-2. Designation of Search Condition]

A search condition used for searching a product in the electronic mall and a Web page for designating a search condition will be described below with reference to FIG. 2.

When a product is searched in the electronic mall, a keyword, a product genre or the like can be designated as a search condition. A keyword designated as a search condition is called "search keyword." The user may designate both a search keyword and a genre at the same time as search conditions or may designate either of them.

A product genre (exemplary category according to the present invention) is a range to which products having similar type, property or use application or the like belong when products are classified by type, property, use application or the like, for example. The product genres are hierarchically defined in a tree structure. Specifically, each node in the tree structure corresponds to a genre. A depth of a node corresponds to a level (hierarchy) of the genre corresponding to the node. The depth of a node is a distance from the node positioned at the root (which will be called "root node" below). In the tree structure, the root node defines a genre called genre top for convenience. As a value of the level is larger, a depth of the level is larger, and as a value of the level is smaller, a depth of the level is smaller. The genre top indicates that the user designate no genre. The genre top is a genre at level 0. A genre corresponding to a child node is a genre at level 1 with respect to the genre top. The genre at level 1 is substantially the highest-ordered genre as a user-designatable genre. The genres at level 1 include "water•soft drink", "beauty•cosmetics•perfume", "pet•pet goods", "ladies fashion", "men's fashion", and the like, for example. A genre corresponding to a child node is defined as a genre at level 2 with respect to each genre at level 1. Herein, a genre c2 corresponding to a child node of a certain genre c1 is called "child genre" of the genre c1. The child genre is also called sub-genre. The genre c1 at this time is called "parent genre" of the genre c2. The child genre is a range to which similar products belong when the parent genre is further classified. Thus, the child genre belongs to the parent genre. A genre corresponding to a descendent node is called "descendent genre" with respect to a certain genre. For example, a genre c3 is assumed as a child genre of the genre c2. In this case, the genres c2 and c3 are the descendent genres of the genre c1. When a certain genre has a child genre, a plurality of child genres are usually defined. For example, the child genres of "water•mineral water" define "water•mineral water", "soft drink", "coffee•cocoa", and the like, for example. The genres belonging to the same parent genre are called brother genre. For example, "water-mineral water", "soft drink", and "coffee•cocoa" are mutually the brother genres. For the genres at and subsequent to level 2, a child genre is defined as needed.

The Web pages for designating a search condition include the top page and a search result page, for example. The top page is a Web page positioned at the highest order in the electronic mall. The search result page is a Web page indicating a product search result. The search result page is a Web page for designating a search condition for refining and searching products from the searched products (which will be called "refinement condition" below) or re-designating a search condition. When the user designates a search condition in the top page, a products is searched under the designated search condition by the electronic mall server 1, and a search result page indicating the search result is displayed by the user terminal 2. Further, when the user designates a search condition in the search result page, a product is searched again under the designated search condition by the electronic mall server 1 and a new search result page displaying the search result is displayed by the user terminal 2.

When the user designates a search condition in the search result page, the search condition designated in the top page or search result page displayed immediately before the search result page (which will be called "previous page" below) may be taken over. For example, it is assumed that a search keyword k1 is designated as a search condition in the top page or search result page. Then, a search result page indicating a search result by the search keyword k1 is displayed. Herein, when the user designates the genre c1 as a search condition, the search keyword k1 and the genre c1 are considered as being designated as search conditions. Then, a new search result page indicating a search result by the search keyword k1 and the genre c1 is displayed. That is, the user designated the genre c1 as a refinement condition. It is assumed that the genre c2 is designated as a search condition in the top page or search result page. A search result page indicating a search result by the genre c2 is displayed. Herein, when the user designates a search keyword k2 as a search condition, the genre c2 and the sear keyword k2 are considered as being designated as search conditions. Then, a new search result page indicating a search result by the genre c2 and the search keyword k2 is displayed. That is, the user designated the search keyword k2 as a refinement condition. In the following description, the designation of a search keyword or a genre as a search condition in a previous page includes when the user inputs a search keyword or selects a genre in a previous page for explicit designation and when a search condition is taken over thereby to be regarded as being designated.

FIG. 2(a) is a figure illustrating exemplary display of the top page of the electronic mall. As illustrated in FIG. 2(a), the top page includes a search condition setting region 110, a genre list display region 120, and the like.

The search condition setting region 110 includes a keyword input column 111, a genre selection menu 112, a search button 113 and the like. The keyword input column 111 is an input region for inputting a search keyword therein. The genre selection menu 112 is a pull-down menu for selecting a genre to be designated as a search condition from among the genres at level 1. The search button 113 is a button for designating a search keyword input in the keyword input column 111 and a genre selected in the genre selection menu 112 as search conditions. When the search button 113 is selected while a search keyword is input, the search keyword is designated as a search condition and a search is made under the search condition. Then, when the search button 113 is selected while a genre is selected, the genre is designated as a search condition and a search is made under the search condition. The user operates the search condition setting region 110, thereby designating both or either of a search keyword and a genre as a search condition.

FIG. 2(b) is a figure illustrating exemplary display of a search keyword candidate display region 114. The keyword input column 111 corresponds to a keyword suggest function. The keyword suggest function is a function of displaying a search keyword candidate and enabling the candidate to be designated as a search keyword. Specifically, when the user starts inputting a search keyword in the keyword input column 111, as illustrated in FIG. 2(*b*), the search keyword candidate display region 114 is displayed immediately below the keyword input column 111. The search keyword candidate display region 114 displays therein a list of search keyword candidates. A keyword displayed as a candidate is a search keyword matching in the left-hand part with a character string input in the keyword input column 111. When a kana is input in the keyword input column 111, a keyword displayed as a candidate is a keyword matching in the left-hand part with the input kana. For example, if "HA" is initially input, the keyword candidate display region 114 displays therein "HANGAR RAKKU (hangar rack)", "HATUDENKI (generator)", "HANKO (stamp)", "HARU (spring)" and "HASAMI (scissors)", for example. If "N" is next input, "HAN" is input in the keyword input column 111. In this case, the search keyword candidate display region 114 displays the keywords such as "HANGAR RAKKU (hangar rack)", "HANKO (stamp)", "HANMOKKU (hammock)" and "HANKATI (handkerchief)" therein. An upper limit of the number of keywords displayable in the search keyword candidate display region 114 is previously set. When the user selects any keyword from among the keywords displayed in the search keyword candidate display region 114, the selected keyword is designated as a search condition and a search is made under the search condition. When a genre is selected in the genre selection menu 112 at this time, the genre is also designated as a search condition.

The genre list display region 120 displays a list of genres therein. Each genre displayed in the genre list display region 120 is integrated genres at level 1. When the user selects any genre from among the genres displayed in the genre list display region 120, a list of genres at level 1 belonging to the selected genre is displayed. Then, when the user selects any genre from among the displayed genres at level 1, the selected genre is designated as a search condition and a search is made under the search condition.

FIG. 2(*c*) illustrates exemplary display of a search result page. As illustrated in FIG. 2(*c*), the search result page includes a search condition setting region 210, a genre designation region 220, an associated keyword display region 230, a search result display region 240 and the like.

The search condition setting region 210 includes a keyword input column 211, a search button 212 and the like. The keyword input column 211 is an input region for inputting a search keyword therein. Further, the keyword input column 211 corresponds to a keyword suggest function like the keyword input column 111 on the top page. When a search keyword is designated as a search condition in a previous page, the search keyword is previously input in the keyword input column 211. When the search button 212 is selected while the search keyword is input in the keyword input column 211, the search keyword is designated as a search condition and a search is made under the search condition. Herein, if a genre is designated as a search condition in a previous page, the genre is also regarded as being designated as a search condition together with the search keyword.

The genre designation region 220 includes one more genre links 221. The genre link 221 is directed for designating a genre as a refinement condition, and indicates the name of a genre to be designated. When the user selects any genre link 221 from the genre designation region 220, a genre corresponding to the selected genre link 221 is designated as a search condition, and a search is made under the search condition. If a search keyword is designated as a search condition in a previous page, the search keyword is also regarded as being designated as a search condition together with the genre. When a genre is designated as a search condition in a previous page, the genre designation region 220 displays a genre link 221 corresponding to a child genre of the designated genre. On the other hand, when a search result page is displayed with only the search keyword designated as a search condition in the top page, a genre link 221 corresponding to a genre at level 1 is displayed in the genre designation region 220 in the search result page.

The associated keyword display region 230 is displayed when a search keyword is designated as a search condition in a previous page. The associated keyword display region 230 includes an associated keyword link 231. The associated keyword link 231 is directed for re-designating a keyword associated with a search keyword designated in a previous page (which will be called "associated keyword" below) as a search condition and searching a product, and indicates an associated keyword to be designated. Associated keywords of a search keyword include a word similar to the search keyword, a word meaning objects associated with the object indicated by the search keyword, a word containing the search keyword, and the like. An upper limit of the number of associated keywords displayable in the search keyword candidate display region 114 is previously set. When the user selects any associated keyword link 231 from the associated keyword display region 230, an associated keyword corresponding to the selected associated keyword link 231 is designated as a search keyword, and a search is made under the search condition. Herein, when a genre is designated as a search condition in a previous page, the genre is also regarded as being designated as a search condition together with the search keyword.

The search result display region 240 displays a list of information on searched products therein. Specifically, the search result display region 240 displays relevant product information 241 containing searched product image, product name, price, shop name and the like per product. The relevant product information 241 is displayed in a display order of the searched products. Specifically, the relevant product information 241 is displayed in an upper part in the search result display region 240 in a higher display order. Further, an upper limit of the number of items of the relevant product information 241 displayable in the search result display region 240 is previously determined. For example, when the upper limit is 30, the search result display region 240 displays the relevant product information 241 on the top 30 products. Herein, when the user selects a link displaying "next 30", a new search result page is displayed on the screen of the user terminal 2 and the search result display region 240 in the search result page displays the relevant product information 241 on the 31- to 60-ordered products. A display order of the relevant product information 241 is determined based on listing scores. The listing score is a value indicating an evaluation determined for a product or a product page of the product. A higher listing score indicates a higher evaluation. Then, as a product has a higher listing score, a display order of the relevant product information 241 on the product is higher. For example, a listing score may be higher as a product page is more accessed (more viewed), or a listing score may be higher as a product is purchased more times. When the user selects any relevant product information 241 from among the relevant product information 241 displayed in the search result display region 240, a product page is displayed on the screen. The product page is a Web page displaying therein detailed information on a product corresponding to the selected relevant product information 241. The user can purchase a product whose information is displayed in the product page by performing a purchase operation in the product page.

[1-3. Extraction of Pair of Search Keyword and Genre, and Application of Extraction Result]

The electronic mall server 1 extracts a search keyword and a genre having a high degree of relevance with the search keyword and registers them in an associated manner in a database in order to enhance user's convenience in a search result page.

A genre having a high degree of relevance with a search keyword is a genre which is designated as a search condition together with the search keyword many times. The number of times is called "number of designations." When the user designates a search condition, a search query is transmitted from the user terminal 2 to the electronic mall server 1. The search query is a message indicating a request for a product. When a search keyword is designated as a search condition, the designated search keyword is set in the search query. When a genre is designated as a search condition, the genre ID is set in the search query. The genre ID is genre identification information. When receiving the search query from the user terminal 2, the electronic mall server 1 records a query log. The query log is a history of the received search query. The electronic mall server 1 calculates the number of designations of each pair of search keyword and genre designated as search conditions based on the query logs.

The number of designations includes the number of times when the user explicitly designates both a search keyword and a genre at the same time, and the number of times when the user designates either one of a search keyword and a genre in a previous page and designates the other as a refinement condition in a search result page displayed thereby so that both the search keyword and the genre are considered as being designated. When the user designates a search keyword and a genre, for example, the user may think that a product which he/she wants to search by the designated search keyword is in the products in the designated genre. That is, the user thinks that the designated search keyword is associated with the genre. This is because a product he/she wants to search meets the search conditions indicated by the designated search keyword and genre. Thus, a pair of search keyword and genre is designated more times, and thus the search keyword and the genre may have a higher degree of relevance therebetween. Then, if a search keyword is associated with a genre having a high degree of relevance with the search keyword, user's convenience may be enhanced on search.

A determination is made as to whether a pair of search keyword k and genre c is designated many times based on the number of designations of a pair of search keyword k and brother genre of the genre c. As the number of designations of the genre c is relatively larger, the genre c may have a higher degree of relevance with the search keyword k than other genres.

A relevance score is determined for a pair of search keyword and genre extracted as having a high degree of relevance. The relevance score indicates a degree of relevance between a search keyword and a genre. A higher relevance score indicates a higher degree of relevance.

A method for extracting a pair of search keyword and genre having a high degree of relevance therebetween will be described below in detail. Applications of an extraction result of the pair will be described below.

The first application is to control display of genre links 221 in the genre designation region 220 in a search result page. Specifically, when a search keyword is designated as a search condition in a previous page, the genre designation region 220 preferentially displays therein a genre link 221 having a high degree of relevance with the designated search keyword. A genre link 221 in the genre designation region 220 is displayed in a higher order as the relevance score between a designated search keyword and a genre is higher. When the genre links 221 as a series of genres are displayed, the user may select a genre link 221 of a genre regarded as being associated with the previously-designated search keyword. Thus, a genre having a higher degree of relevance with the designated search keyword is more likely to be designated as a refinement condition by the user. Therefore, the user can easily search a genre to be designated as a refinement condition from the genre designation region 220.

Figure 3:
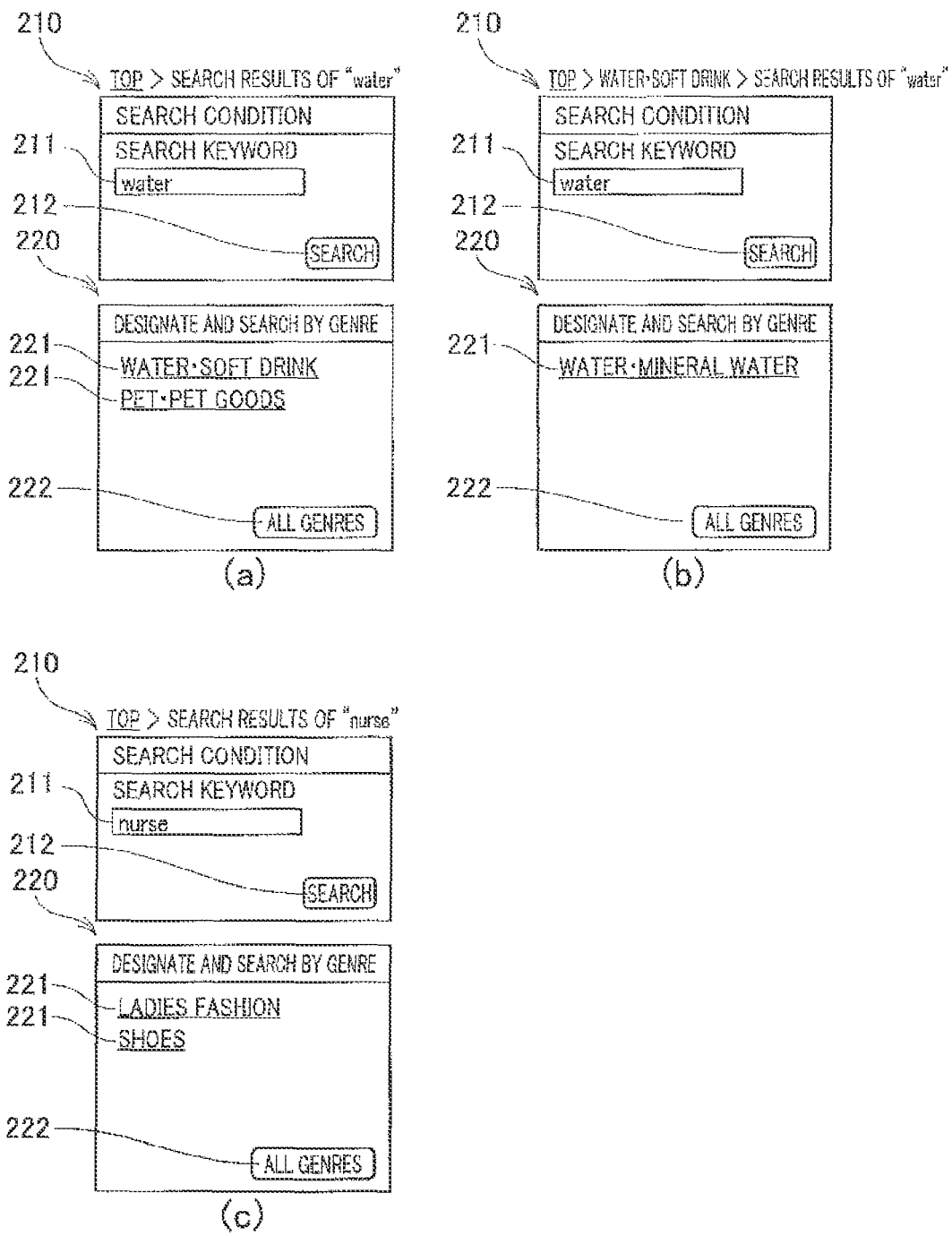
FIGS. 3(*a*) to 3(*c*) are figures illustrating exemplary display of genre links 221 in a genre designation region 220.

FIGS. 3(*a*) to 3(*c*) are figures illustrating exemplary display of genre links 221 in the genre designation region 220. For example, it is assumed that a search keyword "water" has a high degree of relevance with "WATER•SOFT DRINK", "WATER•MINERAL WATER" and "PET•PET GOODS", respectively. In this case, when the user designates a search keyword "water" in the top page, "WATER•SOFT DRINK" and "PET•PET GOODS" as the genre links 221 among the genres at level 1 are displayed in the genre designation region 220 in the search result page as illustrated in FIG. 3(*a*). "WATER•SOFT DRINK" is displayed above "PET•PET GOODS", and thus it can be seen that "WATER•SOFT DRINK" has a higher degree of relevance with "water" than "PET•PET GOODS". An all-genres display button 222 is further displayed in the genre designation region 220. When the user selects the all-genres display button 222, the genre links 221 of all the genres at level 1 are displayed in the genre designation region 220. Also in this case, the display positions of "WATER•SOFT DRINK" and "PET•PET GOODS" as the genre links 221 do not change.

Herein, when the user selects "WATER•SOFT DRINK" as the genre link 221, a new search result page is displayed. As illustrated in FIG. 3(*b*), "WATER•MINERAL WATER" as the genre link 221 among the child genres of "WATER•SOFT DRINK" is displayed in the genre designation region 220 in the search result page. Herein, when the user selects the all-genres display button 222, the genre inks 221 of all the child genres of "WATER•SOFT DRINK" are displayed in the genre designation region 220.

For example, it is assumed that a search keyword "nurse" has a high degree of relevance with "LADIES FASHION" and "SHOES", respectively. In this case, when the user designates a search keyword "nurse" in the top page, "LADIES FASHION" and "SHOES" as the genre links 221 among the genres at level 1 are displayed in the genre designation region 220 in the search result page as illustrated in FIG. 3(*c*). In this way, a genre for which the genre links 221 are displayed in the genre designation region 220 changes depending on a search keyword designated in a previous page.

The second application is to control display of a search keyword candidate in the keyword suggest function in the keyword input column 211 in a search result page. This is performed when a genre is designated as a search condition in a previous page. Specifically, a keyword having a high degree of relevance with the genre designated in the previous page, among the keywords matching in the left-hand part with the character string input by the user in the keyword input column 211, is preferentially displayed as a search keyword candidate. The keyword is displayed in a higher order at this time as the relevance score between the designated genre and the keyword is higher. A search keyword having a higher degree of relevance with the designated genre is more likely to be designated as a refinement condition by the user. Therefore, the user can easily designate a search keyword as a refinement condition.

Then, a keyword containing an input character string (such as a keyword whose kana indicating the pronunciation contains the input character string) may be displayed in the keyword input column 211. Thus, for example, a keyword matching in the right-hand part with the input character string may be displayed.

FIG. 4(a) is a figure illustrating exemplary display of a keyword in the search keyword candidate display region 213. The user designates a genre "WATER•SOFT DRINK" in the top page, for example, and then a search result page therefor is displayed. When the user inputs "HA", for example, in the keyword input column 211 in the search result page, the search keyword candidate display region 213 is displayed immediately below the keyword input column 211 as illustrated in FIG. 4(a). The search keyword candidates such as "HAABU TII (herbal tea)", "HANA CHA (flower tea)", "HAIBISUKASU TII (hibiscus tea)", "HATOMUGI CHA (adlay tea)", and "HATOMUGI CHA (adlay tea)" are displayed in the search keyword candidate display region 213. That is, the keywords have a high degree of relevance with "water•soft drink." Even when the user inputs the same character string in the keyword input column 211, a keyword to be displayed in the search keyword candidate display region 213 changes depending on a genre designated in a previous page.

A genre may be designated in a search result page. For example, a check box or the like for selecting a genre is displayed in a search result page. Then, when the user selects a check box corresponding to a genre and inputs a character string in the keyword input column 211, a keyword having a high degree of relevance with the selected genre among the keywords containing the input character string may be displayed in the search keyword candidate display region 213. Further, when the user selects a genre from the genre selection menu 112 and inputs a character string in the keyword input column 111 in the top page, a keyword having a high degree of relevance with the selected genre among the keywords containing the input character string may be displayed in the search keyword candidate display region 114.

The third application is to control display of associated keyword links 231 in the associated keyword display region 230. This is performed when a search keyword and a genre are designated as search conditions in a previous page. Specifically, an associated keyword link 231 of an associated keyword having a high degree of relevance with the genre designated in a previous page among the associated keywords of the search keyword designated in the previous page is preferentially displayed in the associated keyword display region 230. A display order of the associated keyword link 231 in the associated keyword display region 230 is higher as the relevance score between the designated genre and the associated keyword is higher. As the associated keyword has a higher degree of relevance with the designated genre, the user is more likely to designate the associated keyword as a refinement condition. Thus, the user can easily designate the associated keyword as a search keyword.

FIG. 4(b) is a figure illustrating exemplary display of associated keyword links 231 in the associated keyword display region 230. For example, when the user designates a search keyword "water" and designates a genre "WATER•SOFT DRINK" in the top page, the associated keyword links 231 such as "MINERAL WATER" and "WATER SERVER" of the keyword are displayed in the associated keyword display region 230 in the search result page as illustrated in FIG. 4(b). That is, the keywords have a high degree of relevance with "WATER•SOFT DRINK." Even when the user designates the same search keyword in the previous page, an associated keyword for which an associated keyword link 231 is displayed in the associated keyword display region 230 changes depending on a genre designated in the previous page.

The fourth application is to adjust a listing score for determining a display order of relevant product information 241 on each product in the search result display region 240. This is performed when a search keyword is designated in a previous page. Specifically, among the products searched by a search keyword designated in a previous page, a listing score of a product having a high degree of relevance with the search keyword is increased. When a genre is designated as a search condition in the previous page, only the listing scores of products belonging to descendent genres of the designated genre are increased. Thereby, a display order of a product in a genre having a high degree of relevance with the search keyword may be increased. Therefore, the user can easily search a product having a high degree of relevance with the search keyword from the search result display region 240. Further, a listing score of a product other than the products in the genres having a high degree of relevance with the search keyword may be lowered.

For example, when the user designates a search keyword "water" in the top page, a list of information on products searched by "water" is displayed in the search result display region 240 in a search result page. At this time, the listing scores of the products for "WATER•SOFT DRINK" and the products for "PET•PET GOODS" having a high degree of relevance with "water" are increased.

[2. Structure of Electronic Mall Server]

A structure of the electronic mall server 1 will be described below with reference to FIG. 5 and FIG. 6.

FIG. 5 is a block diagram illustrating an exemplary outline structure of the electronic mall server 1 according to the present embodiment. As illustrated in FIG. 5, the electronic mall server 1 comprises a communication unit 11, a storage unit 12, an I/O interface 13, and a system control unit 14. The system control unit 14 is connected with the I/O interface 13 via a system bus 15.

The communication unit 11 is connected to the network NW to control a communication state with the user terminal 2 or the like.

The storage unit 12 is configured of a hard disk drive or the like, for example. The storage unit 12 constructs therein databases such as a member information DB 12a, a product information DB 12b, a genre information DB 12c, a keyword DB 12d, an associated keyword DB 12e, a query log DB 12f, a designation frequency information DB 12g and a keyword-associated genre information DB 12h.

FIG. 6(a) is a figure illustrating exemplary contents registered in the member information DB 12a. The member information DB 12a registers therein member information on users member-registered in the shopping system S. Specifically, the member information DB 12a registers therein user's attributes such as user ID, password, nickname, name, date of birth, sex, zip code, address, phone number, e-mail address and number of holding points in an associated manner per user. The user ID is user identification information. The number of holding points is the number of points held by the user. This points is regarded as money and the user may use the points for purchasing a product in the electronic mall. When the user purchases a product in the electronic mall, points based on the purchase price are given to the user, for example.

FIG. 6(b) is a figure illustrating exemplary contents registered in the product information DB 12b. The product information DB 12b registers therein product information on products sold in the electronic mall. Specifically, the product information DB 12b registers therein product attributes such as product ID, shop ID, product code, genre ID, product name, product image URL (Uniform Resource locator), product explanation and product price in an associated manner per product sold by a shop. The product ID is product identification information by which the shop or the like manages a product to be sold. The shop ID indicates a shop selling the product. The product code is a code number for identifying a product. The product code may be JAN (Japanese Article Number Code) code or the like, for example. The genre ID is a genre ID of a genre to which the product belongs. With the searching using a search keyword, a product for which a search keyword is contained in at least either of the product name and the product explanation is searched, for example.

FIG. 6(c) is a figure illustrating exemplary contents registered in the genre information DB 12c. The genre information DB 12c registers therein genre information on genres of products. Specifically, the genre information DB 12c registers therein genre attributes such as genre ID, genre name, genre level, and list of parent genre IDs and child genre IDs in an associated manner per genre. The genre information is set by a manager of the electronic mall, or the like, for example. The parent genre ID is a genre ID of a parent genre of the genre defined by the genre information. The list of child genre IDs is a list of genre IDs of the child genres of the genre defined by the genre information. The list of child genre IDs is set when the genre defined by the genre information has a child genre. The genre information DB 12c registers genre information on the genre top therein. Previously-set identification information is set for the genre ID of the genre top, for example. Thereby, it is possible to identify which genre information is genre information on the genre top.

FIG. 6(d) is a figure illustrating exemplary contents registered in the keyword DB 12d. The keyword DB 12d registers therein a plurality of keywords as search keyword candidates in the keyword suggest function. For example, the keyword DB 12d registers therein a search keyword, the number of designations of which is the preset number of times or more, among the search keywords designated as search conditions by each user in a preset period of time.

FIG. 6(e) is a figure illustrating exemplary contents registered in the associated keyword DB 12e. The associated keyword DB 12e registers therein a plurality of pairs of keyword and associated keyword associated with the keyword. Then, a method for extracting an associated keyword may employ a well-known method, for example. Thereby, a detailed explanation of the method for extracting an associated keyword will be omitted.

FIG. 6(f) is a figure illustrating exemplary contents registered in the query log DB 12f. The query log DB 12f registers query logs therein. Specifically, the query log DB 12f registers therein time/date of reception, search keyword, genre ID, sex, age, prefecture and the like in an associated manner whenever a search query is received. Time/date of reception is a time/date when a search query is received. Search keyword is a search keyword designated as a search condition. Genre ID is the genre ID of a genre designated as a search condition. Sex, age and prefecture are attributes of the user utilizing the user terminal 2 transmitting the search query. That is, user's sex, age, user-resident prefecture, and the like are registered as the attributes of the user requesting to search. Sex, age and prefecture are registered when the user requesting to search is logging in the electronic mall.

FIG. 6(g) is a figure illustrating exemplary contents registered in the designation frequency information DB 12g. The designation frequency information DB 12g registers therein designation frequency information on the number of designations as a search condition for a pair of search keyword and genre. Specifically, the designation frequency information DB 12g registers therein one or more pairs of genre ID and number of designations in association with a search keyword. The genre ID is of a genre designated as a search condition together with the search keyword. The number of designations is the number of times when the genre is designated as a search condition together with the search keyword.

FIG. 6(h) is a figure illustrating exemplary contents registered in the keyword-associated genre information DB 12h. The keyword-associated genre information DB 12h registers therein an extraction result for a pair of search keyword and genre having a high degree of relevance therebetween. Specifically, the keyword-associated genre information DB 12h registers search keyword, genre ID and relevance score per extracted pair.

Other information stored in the storage unit 12 will be described below. The storage unit 12 stores therein various items of data such as HTML (HyperText Markup Language) document for displaying Web pages, XML (Extensible Markup Language) documents, image data, text data and electronic documents. The storage unit 12 stores therein various setting values set by the manager and the like.

The storage unit 12 stores therein various programs such as operating system, WWW (World Wide Web) server program, DBMS (Database Management System), electronic commerce management program, and product evaluation program. The electronic commerce management program is directed for performing the processings for the electronic mall, such as extracting a pair of search keyword and genre having a high degree of relevance therebetween, generating a search result page, searching a product, and ordering a product. The product evaluation program is directed for determining a listing score of each product. The listing score of each product is updated as needed by the product evaluation program, and the listing score is stored in the storage unit 12 in association with the product ID, for example. The system control unit 14 can acquire the listing score from the product evaluation program via a dedicated API (Application Programming Interface), for example. Various programs may be acquired from other server apparatuses and the like via the network NW, or may be recorded in a recording medium such as DVD (Digital Versatile Disc) and read via a drive device.

The I/O interface 13 performs an interface processing between the communication unit 11 as well as storage unit 12, and the system control unit 14.

The system control unit 14 is configured of a CPU 14a, a ROM (Read Only Memory) 14b, a RAM (Random Access Memory) 14c, and the like. The CPU 14a reads and executes various programs so that the system control unit 14 functions as an acquisition means, a registration means, a keyword acquisition means, a display order determination means, a character string acquisition means, a keyword determination means, an evaluation value acquisition means and an evaluation value change means according to the present invention.

The electronic mall server 1 may be configured of a plurality of server apparatuses. For example, a server apparatus for extracting a pair of search keyword and genre having a high degree of relevance therebetween, a server apparatus for performing the processings of searching and ordering a product, a server apparatus for transmitting a Web page in response to a request from the user terminal 2, a server apparatus for managing a database, and the like may be connected to each other via LAN or the like.

[3. Method for Extracting Pair of Search Keyword and Genre having High Degree of Relevance Therebetween]

Figure 7:
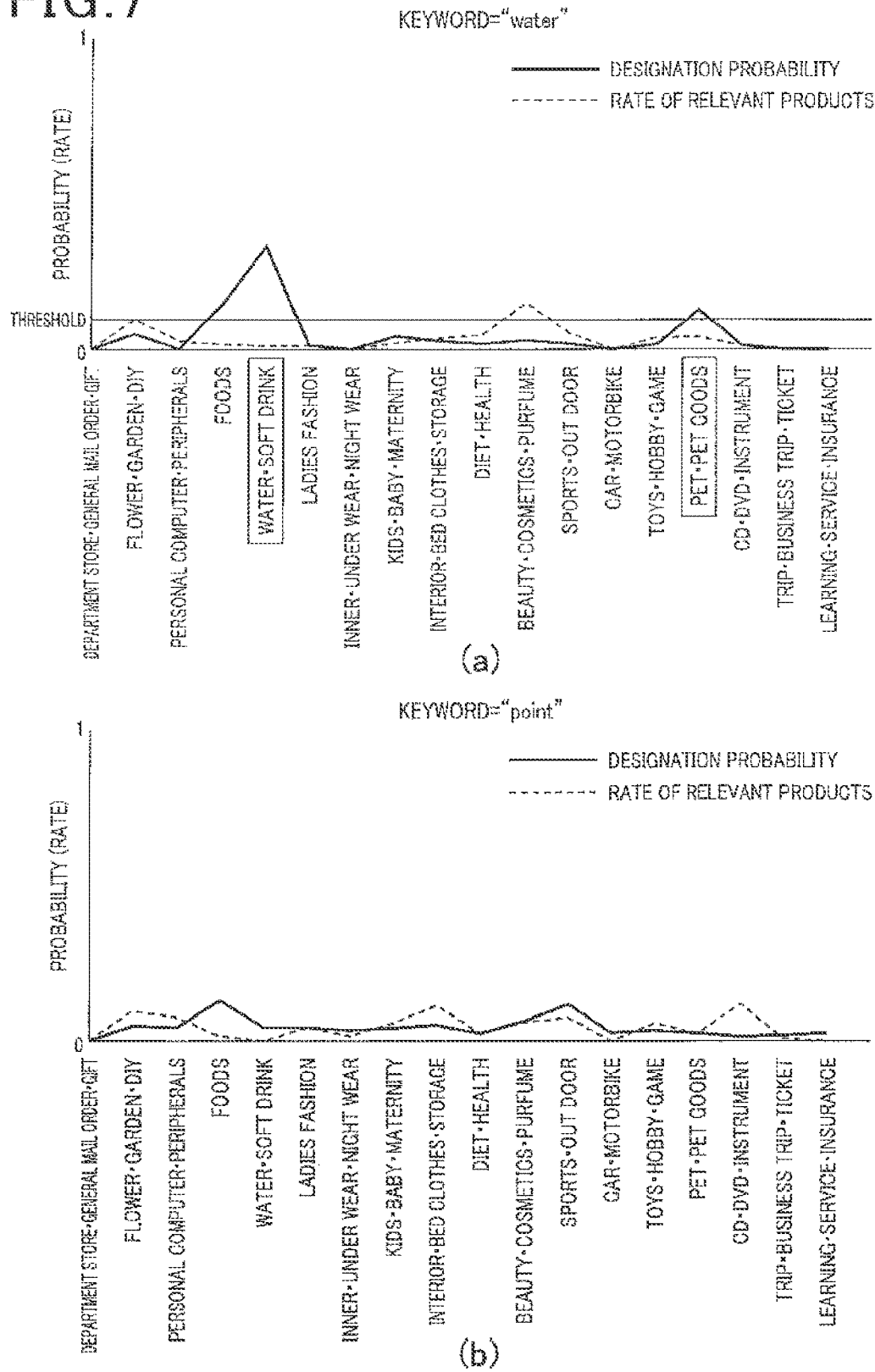
FIGS. 7(*a*) and 7(*b*) are graphs indicating a designation probability per genre at level 1.

A method for extracting a pair of search keyword and genre having a high degree of relevance therebetween will be described below in detail with reference to FIG. 7 and FIG. 8.

Herein, a search keyword to be extractable is assumed as k. A genre having a high degree of relevance with the keyword k is assumed to be extracted from the genres at level 1 for convenient description. A set of genres at level 1 is assumed as G. At first, the system control unit 14 determines whether a genre having a high degree of relevance with the keyword k may be present in the genres at level 1. Specifically, each genre is determined as to a degree of variation (offset) of the number of designations when it is designated as a search condition together with the keyword k. As each genre is less varied in the number of designations or is higher in uniformity, there is no difference between each genre and the keyword k in their relevance. Then, no difference in their relevance indicates that a genre having a particularly high degree of relevance with the keyword k is not present in the genres at level 1. When a degree of variations of the number of designations exceeds a variably-set certain degree, the system control unit 14 determines that a genre having a high degree of relevance with the keyword k is present in the genres at level 1. The determination employs entropy, for example. Assuming the entropy as E, E is calculated in the following Equation 1.

[Mathematical Formula 1]

$$E = \sum_{c \in G} p(c) \log p(c) \qquad \text{Equation 1}$$

In Equation 1, p(c) is a probability at which the genre c is designated (which will be called "designation probability" below) when the keyword k is designated as a search condition together with a genre at level 1. p(c) is calculated in the following Equation 2.

[Mathematical Formula 2]

$$p(c) = \frac{sc(k, c)}{\sum_{g \in G} sc(k, g)} \qquad \text{Equation 2}$$

In Equation 2, sc(k, c) is the number of times when the genre c is designated as a search condition together with the keyword k. p(c) is calculated based on the number of times when the genre c was designated together with the keyword k in the past, and thus p(c) is also a rate at which the genre c is designated for all the genres at level 1.

The system control unit 14 calculates the entropy E and then compares the entropy E with a threshold. Assuming the threshold as α, when E≤α is met, it is determined that a genre having a high degree of relevance with the keyword k is present. The entropy E tends to be higher as the number of genres at level 1 is larger. This is because the maximum value of the entropy E is higher as the number of genres is larger. Thus, the threshold α needs to be variably set depending on the number of genres. Assuming the number of genres at level 1 as n, the maximum value of the entropy E is log(n). The system control unit 14 calculates the threshold α in the following Equation 3, for example.

[Mathematical Formula 3]

$$\alpha = K1 \log(n) \qquad \text{Equation 3}$$

In Equation 3, K1 is a constant meeting 0<K1<1. K1 is set by the manager, for example. A method for determining the threshold α is not limited to the method described herein. The threshold α may be determined to be higher as the number of genres is larger. A value indicating a variation of the number of designations may be calculated with a method other than entropy calculation.

When determining that a genre having a high degree of relevance with the keyword k may be present in the genres at level 1, the system control unit 14 determines which genre has a high degree of relevance with the keyword k from among the genres at level 1. Specifically, the system control unit 14 compares the designation probability with a threshold. Assuming the threshold as β, when p(c)≥β is met, it is determined that the genre c has a high degree of relevance with the keyword k. The threshold β is the minimum value of the designation probability at which the genre c is determined to have a high degree of relevance with the keyword k. The designation probability tends to be higher as the number of genres at level 1 is smaller. Thus, the threshold β needs to be variably set depending on the number of genres. Thus, the system control unit 14 calculates the threshold β in the following Equation 4, for example.

[Mathematical Formula 4]

$$\beta = \begin{cases} K2\dfrac{1}{n} & n < K3 \\ K2\dfrac{1}{K3} & n \geq K3 \end{cases} \qquad \text{Equation 4}$$

In Equation 4, K2 is a constant meeting K2≤2. K3 is an integer constant of 3 or more. K2 and K3 are set by the manager, for example. When K2 is set at 1 or more, the threshold β can be set at 1/n or more as an average value of the designation probability. The threshold β is set depending on the number of genres when the number of genres is less than K3 because 1/n largely changes relative to a change in the number of genres when the number of genres is small. On the other hand, the threshold β is set to be constant when the number of genres is K3 or more because a genre which does not actually have a high degree of relevance with the keyword k is more likely to be determined to have a high degree of relevance therebetween when the threshold β is too small. A method for determining the threshold β is not limited to the method described herein. The threshold β may be determined to be higher as the number of genres is smaller.

Herein, the designation probability p(c) is the relative number of designations of the genre c for the total numbers of designations of all the genres at level 1. Thus, a determination as to whether the designation probability is the threshold β or more is a determination as to whether the number of designations sc (k, c) of the genre c is equal to or more than a threshold β2 of the number of times calculated in the following Equation 5.

[Mathematical Formula 5]

$$\beta 2 = \begin{cases} K2 \dfrac{1}{n} \sum_{g \in G} sc(k, g) & n < K3 \\ K2 \dfrac{1}{K3} \sum_{g \in G} sc(k, g) & n \geq K3 \end{cases} \quad \text{Equation 5}$$

The threshold β2 is the minimum value of the number of designations when the genre c is determined to have a high degree of relevance with the keyword k. The system control unit 14 may determine whether the genre c has a high degree of relevance with the keyword k by comparing the number of designations with the threshold β2 instead of comparing the designation probability with the threshold β.

When it is determined that the genre c has a high degree of relevance with the keyword k, the system control unit 14 determines a relevance score for the pair of genre c and keyword k. For example, the relevance score may be higher as the number of designations is larger. For example, the number of designations itself may be employed as a relevance score. The relevance score may be determined such that the relevance score is higher as the number of designations is larger and the relevance score is higher as the designation probability is larger. For example, a calculation equation using the number of designations and the designation probability as variables may be used to calculate a relevance score. When determining a relevance score, the system control unit 14 registers the keyword k, the genre ID of the genre c, and the relevance score in the keyword-associated genre information DB 12h in an associated manner.

Exemplary extraction results of pairs of keyword and genre having a high degree of relevance therebetween will be described herein. FIG. 7(a) and FIG. 7(b) are graphs indicating a designation probability per genre at level 1. FIG. 7(a) and FIG. 7(b) indicate the graphs only for some genres among all the genres at level 1.

FIG. 7(a) indicates an example in which the keyword k is "water." In FIG. 7(a), the graph in a solid line is a graph of the designation probability. As illustrated in FIG. 7(a), a designation probability of each genre largely varies. For example, the designation probabilities of "WATER•SOFT DRINK" and "PET•PET GOODS" are higher than the designation probabilities of other genres among the genres at level 1. In particular, the designation probability of "WATER•SOFT DRINK" is conspicuously higher. Thus, it is determined that the entropy E is the threshold α or less. That is, it is determined that a genre having a high degree of relevance with "water" may be present. The designation probabilities of "WATER•SOFT DRINK" and "PET•PET GOODS" are the threshold β or more, and thus the pair of "water" and "WATER•SOFT DRINK" and the pair of "water" and "PET•PET GOODS" are extracted as pairs of keyword and genre having a high degree of relevance therebetween.

FIG. 7(a) also illustrates a graph in a dashed line. The graph in a dashed line indicates a rate of the number of relevant products in each genre relative to the number of products searched by "water (水)" (which will be called "number of relevant products" below) in all the genres at level 1 when the keyword k is assumed as "water (水)". As illustrated in FIG. 7(a), the rate of the number of relevant products does not correlate with the designation probability. That is, the rate of the number of relevant products does not correlate with a degree of relevance with the keyword k. For example, a rate of the number of relevant products for "BEATY•COSMETICS•PERFUME" is larger than the rates of other genres among the genres at level 1. This is because the characters "香水 (perfume)" are contained in the product name or product explanation of "BEATY•COSMETICS•PERFUME" in many cases and the products for which "water (水)" is contained in the product names or product explanations are consequently searched. On the other hand, the designation probability of "BEATY•COSMETICS•PERFUME" is not necessarily high. To the contrary, the rate of the number of relevant products for "WATER•SOFT DRINK" is remarkably small.

FIG. 7(b) illustrates an example in which the keyword k is "point." As illustrated in FIG. 7(b), a designation probability of each genre is less varied. This is because a description on point in the product name or product explanation can be uniformly found in any genre. Thus, it is determined that the entropy E is larger than the threshold α. That is, it is determined that a genre having a high degree of relevance with "point" is not present.

The genres at and subsequent to level 2 will be described below. FIG. 8 is a figure illustrating how a genre associated with the keyword k is extracted at each level. When extracting a genre having a high degree of relevance with the keyword k from among the genres at level 1, the system control unit 14 tries to extract a genre having a high degree of relevance with the keyword k from among the child genres of the extracted genre. For example, as illustrated in FIG. 8, it is assumed that the genre g1 is extracted as a genre having a high degree of relevance with the keyword k from among the genres g1, g2, g3 and the like at level 1. In this case, a genre having a high degree of relevance with the keyword k is extracted from among the child genres g11, g12, g13 and the like of the genre g1. This is because when a genre has a high degree of relevance with the search keyword, a genre having a high degree of relevance with the search keyword may be present also among the child genres of the genre. On the other hand, a genre is not extracted from the child genres of the genre g2 and the child genres of the genre g3.

The method for extracting a genre having a high degree of relevance with the keyword k at and subsequent to level 2 is basically the same as for level 1. In Equation 1 and Equation 2 for calculating the entropy E, a set of child genres of a genre which is determined to have a high degree of relevance with the keyword k may be assumed as G. In Equation 3 and Equation 4 for calculating a threshold, the number of child genres of a genre which is determined to have a high degree of relevance with the keyword k may be set at n.

Figure 8:
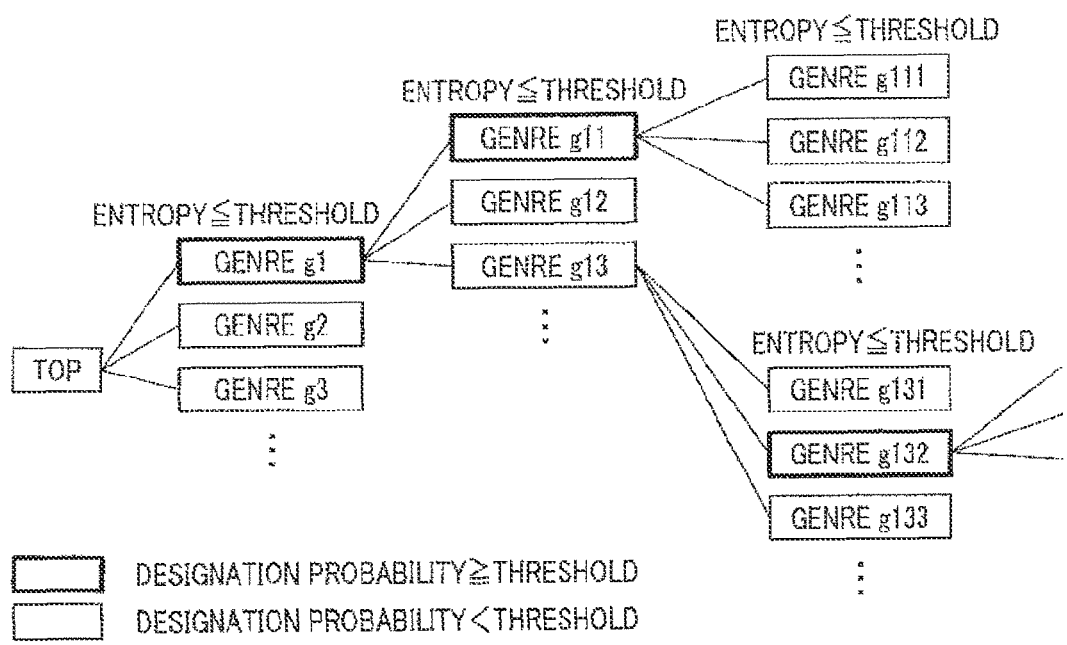
FIG. 8 is a figure illustrating how a genre associated with a keyword k is extracted at each level.

In FIG. 8, the entropy E is a threshold α1 or less for the child genres of the genre g1, and thus a genre having a high degree of relevance with the keyword k is extracted from among the child genres of the genre g1. For example, the designation probability of the genre g11 and the designation probability of the genre g13 are a threshold β1 or more, respectively, and thus the genre g11 and the genre g13 are registered in association with the keyword k, respectively. A determination is made for the child genres of the genre g11 as to whether the entropy E is the threshold α or less. Herein, a genre is not extracted from among the child genres of the genre g11 since the entropy E is not a threshold α11 or less. On the other hand, a genre having a high degree of relevance with the keyword k is extracted from among the child genres g131, g132, g132 and the like of the genre g13 since the entropy E is a threshold α13 or less. Herein, the designation probability of the genre g132 is a threshold β13 or more and thus the genre 132 is registered in association with the keyword k, for example. Further, a determination is made for the child genres of the genre g132 as to whether the entropy E is a threshold α132 or less. In this way, the system control unit 14 hierarchically extracts a genre having a high degree of relevance with the keyword k by depth-first searching, for example.

By the way, when calculating the number of designations when each genre is designated together with the keyword k, the system control unit 14 adds the number of designation of a child genre to the number of actual designations of the parent genre thereof. For example, it is assumed in FIG. 8 that the numbers of designations of the genres g111, g112 and g113 at level 3 are 5, 7 and 3, respectively. Herein, it is assumed that the number of designations of the genre g11 which is the parent genre of the genre g111 and the like is 10. In this case, a total value of the numbers of designations of the genres g111, g112 and g113 is added to the number of designations of the genre g11. Therefore, the number of designations of the genre g11 reaches 25. Further, 25 which is the number of designations of the genre g11 is added to the genre g1 which is the parent genre of the genre g11. In this way, the number of designations of a genre is reflected on each genre from the parent genre of the genre to the genres at level 1. A certain genre designated together with the keyword k indicates that part of the total parent genre of the genre is designated together with the keyword k. Thus, in this case, this is because the parent genre is also designated together with the keyword k. Further, the number of designations of a child genre may not be added to the number of designations of the parent genre.

[4. Operations of Shopping System]

The operations of the shopping system S will be described below with reference to FIGS. 9 to 15.

Figure 9:
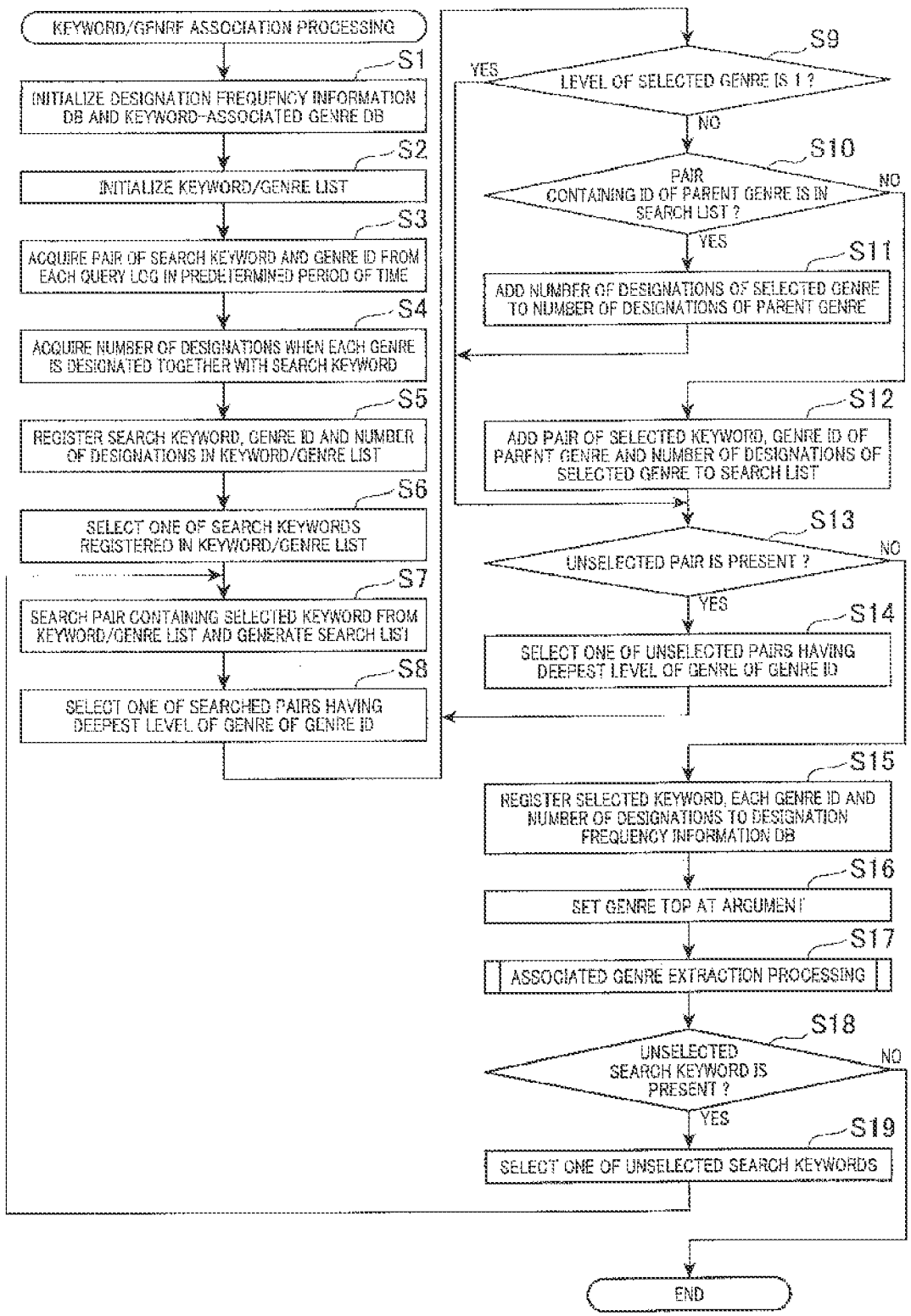
FIG. 9 is a flowchart illustrating exemplary processings in a keyword/genre association processing of a system control unit 14 in the electronic mall server 1 according to the embodiment.

FIG. 9 is a flowchart illustrating exemplary processings in a keyword/genre association processing of the system control unit 14 in the electronic mall server 1 according to the present embodiment. The keyword/genre association processing is directed for associating a keyword and a genre having a high degree of relevance therebetween. The keyword/genre association processing is performed periodically (such as every day), for example.

At first, the system control unit 14 initializes the designation frequency DB 12g and the keyword-associated genre information DB 12h (step S1). Specifically, the system control unit 14 deletes all of the information registered in the databases. Then, the system control unit 14 initializes a keyword/genre list (step S2). The keyword/genre list is a list in which pairs of search keyword, genre ID and number of designations are registered.

Then, the system control unit 14 acquires a pair of search keyword and genre ID from the query logs registered in the query log DB 12f (step S3). Specifically, the system control unit 14 acquires pairs of search keyword and genre ID from the query logs in a period of time when reception time/date is previously set (such as in a period of time from the present time up until 30 days ago). At this time, the system control unit 14 acquires the pairs from the query logs in which both a search keyword and a genre ID are set.

Next, the system control unit 14 as an acquisition means acquires the number of times when each genre is designated as a search condition together with a search keyword (step S4). Specifically, the system control unit 14 selects one pair from among the pairs of search keyword and genre ID acquired from the query logs. Then, the system control unit 14 counts, as the number of designations, the number of pairs having the same search keyword and genre ID as the selected pairs from among the pairs acquired from the query longs. At this time, the system control unit 14 contains the selected pair itself in the number of designations. Then, the system control unit 14 selects one pair from the pairs acquired from the query logs except the same pairs as the previously-selected pairs. Then the system control unit 14 counts the selected pair in the number of designations similarly in the above method. Subsequently, the system control unit 14 performs the same processing until a selectable pair is not present.

When terminating the processing in step S4, the system control unit 14 registers the search keyword, the genre ID and the number of designations in an associated manner in the keyword/genre list for each pair of search keyword and genre ID for which the number of designations is calculated (step S5).

Then, the system control unit 14 selects one of the search keywords registered in the keyword/genre list (step S6). The selected search keyword is called "selected keyword" herein. Then, the system control unit 14 searches a pair containing the same search keyword as the selected keyword from the keyword/genre list. The system control unit 14 generates a search list made of searched pairs (step S7). Then, the system control unit 14 selects one pair in which the level of the genre corresponding to the genre ID is the deepest from among the pairs registered in the search list (step S8). The level of the genre is contained in the genre information corresponding to the genre ID among the genre information registered in the genre information DB 12c. Herein, the genre corresponding to the genre ID contained in the selected pair is called "selected genre."

Then, the system control unit 14 determines whether the level of the selected genre is level 1 (step S9). At this time, when determining that the level of the selected genre is not level 1 (step S9: NO), the system control unit 14 determines whether a pair containing the genre ID of the parent genre of the selected genre is present among the pairs registered in the search list (step S10). The genre ID of the parent genre of the selected genre is contained in the genre information corresponding to the genre ID of the selected genre. When determining that a pair containing the genre ID of the parent genre of the selected genre is present (step S10: YES), the system control unit 14 adds the number of designations contained in the selected pair to the number of designations contained in the pair containing the genre ID of the parent genre (step S11). On the other hand, when determining that a pair containing the genre ID of the parent genre of the selected genre is not present (step S10: NO), the system control unit 14 newly adds the pair of selected keyword, genre ID of the parent genre and number of designations to the search list (step S12). The system control unit 14 assumes the number of designations at this time to be the same as the number of designations contained in the selected pair.

When determining that the level of the selected genre is level 1 in step S9 (step S9: YES), when the processing in step S11 is terminated, or when the processing in step S12 is terminated, the system control unit 14 determines whether an unselected pair is present among the pairs registered in the search list (step S13). At this time, when determining that an unselected pair is present (step S13: YES), the system control unit 14 selects one pair in which the level of the genre corresponding to the genre ID is the deepest from among the unselected pairs (step S14). Then, the system control unit 14 proceeds to step S9. The system control unit 14 repeats the processings in steps S9 to S13, thereby adding the number of designations of each genre to each genre from the parent genre of the genre to the genres at level 1.

On the other hand, when determining that all the pairs are selected (step S13: NO), the system control unit 14 registers the designation frequency information in the designation frequency information DB 12g (step S15). Specifically, the system control unit 14 registers the selected keyword in the designation frequency information DB 12g, and registers the genre ID and the number of designations contained in each pair registered in the search list in association with the selected keyword. Then, the system control unit 14 sets the genre ID of the genre top as an argument of an associated genre extraction processing to be performed next (step S16). Then, the system control unit 14 performs the associated genre extraction processing (step S17). In the associated genre extraction processing, a selected keyword and a genre having a high degree of relevance with the selected keyword are registered in an associated manner. The associated genre extraction processing can make a recursive call. The associated genre extraction processing will be described below in detail.

Then, the system control unit 14 determines whether an unselected search keyword is present in the search keywords registered in the keyword/genre list except the same keywords as the previously-selected search keywords (step S18). At this time, when determining that an unselected search keyword is present (step S18: YES), the system control unit 14 selects one of the unselected search keywords (step S19). Then, the system control unit 14 proceeds to step S7. The system control unit repeats the processings in steps S7 to S19, thereby extracting all the pairs of search keyword and genre having a high degree of relevance therebetween. When determining that all the search keywords are selected (step S18: NO), the system control unit 14 terminates the keyword/genre association processing.

When the selected keyword is designated as a search condition less times, the system control unit 14 may not perform the associated genre extraction processing on the selected keyword. In this case, each genre is designated as a search condition together with the selected keyword less times, and thus it does not necessarily have a high degree of relevance with the selected keyword. For example, the system control unit 14 calculates a total value of the numbers of designations contained in the respective pairs registered in the search list when generating the search list in step S7. When the total value is smaller than a previously-set value, the system control unit 14 does not perform the steps S8 to S17 and proceeds to step S18.

Figure 10:
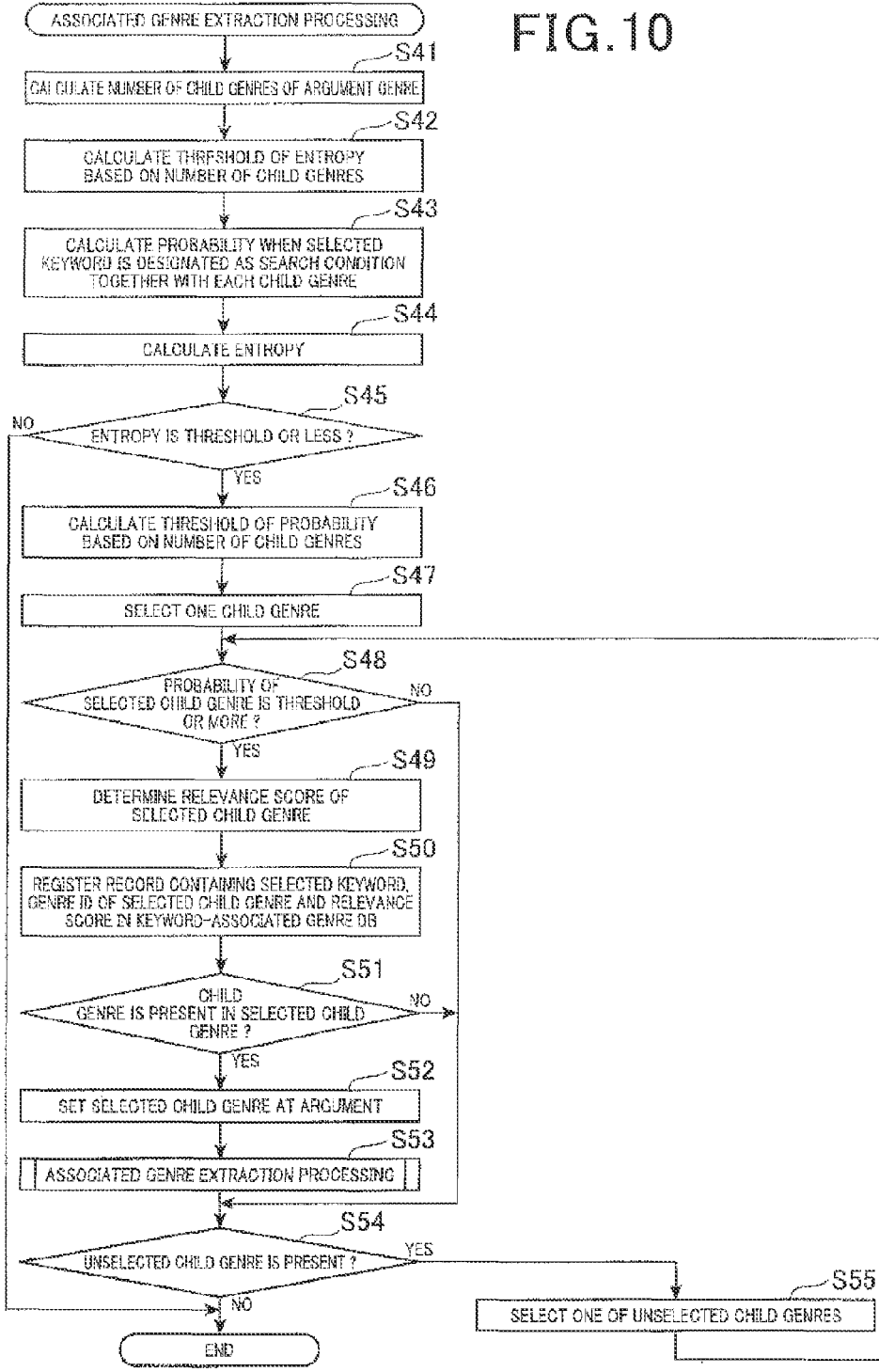
FIG. 10 is a flowchart illustrating exemplary processings in an associated genre extraction processing of the system control unit 14 in the electronic mall server 1 according to the embodiment.

FIG. 10 is a flowchart illustrating exemplary processing in the associated genre extraction processing of the system control unit 14 in the electronic mall server 1 according to the present embodiment.

At first, the system control unit 14 calculates the number of child genres of the genre corresponding to the argument genre ID (step S41). Specifically, the system control unit 14 counts the number of genre IDs registered in the child genre ID list contained in the genre information corresponding to the argument genre ID. Then, the system control unit 14 calculates the threshold α of the entropy based on the calculated number of child genres (step S42). For example, the system control unit 14 calculates the threshold by use of Equation 3 described above.

Then, the system control unit 14 calculates a designation probability corresponding to the selected keyword for each child genre of the genre corresponding to the argument genre ID (step S43). That is, the system control unit 14 performs a processing corresponding to the calculation in Equation 2 described above. Specifically, the system control unit 14 acquires the genre ID from the child genre ID list contained in the genre information corresponding to the argument genre ID. Then, the system control unit 14 searches the number of designations corresponding to the acquired genre ID from the designation frequency information corresponding to the selected keyword. At this time, when the number of designations corresponding to the acquired genre ID is not registered in the designation frequency information, the number of designations of the genre with the genre ID is assumed at 0. The system control unit 14 makes as many searches as the genre IDs registered in the child genre ID list. Then, the system control unit 14 calculates a total value of the numbers of designations searched. The system control unit 14 divides the number of designations searched by the total value, thereby calculating a designation probability.

Then, the system control unit 14 calculates the entropy E based on the calculated number of designations (step S44). That is, the system control unit 14 calculates Equation 1 described above. The system control unit 14 determines whether the entropy E is the threshold α or less (step S45). At this time, when determining that the entropy E is not the threshold α or less (step S45: NO), the system control unit 14 terminates the associated genre extraction processing. On the other hand, when determining that the entropy E is the threshold α or less (step S45: YES), the system control unit 14 calculates the threshold β of the designation probability based on the number child genres (step S46). For example, the system control unit 14 calculates the threshold by use of Equation 4 described above.

Then, the system control unit 14 selects one of the child genres of the genre corresponding to the argument genre ID (step S47). Herein, the selected child genre is called "selected child genre." Then, the system control unit 14 determines whether the designation probability of the selected child genre is the threshold β or more (step S48). At this time, when determining that the designation probability is the threshold β or more (step S48: YES), the system control unit 14 determines the relevance score of the selected child genre depending on the number of designations of the selected child genre (step S49). Then, the system control unit 14 as a registration means associates the selected keyword, the genre ID of the selected child genre and the determined relevance score, and registers them as one record in the keyword-associated genre DB 12h (step S50). Then, the system control unit 14 determines whether a child genre of the selected child genre is set (step S51). Specifically, when a child genre list is set in the genre information corresponding to the genre ID of the selected child genre, the system control unit 14 determines that a child genre is set, and when a child genre list is not set, determines that a child genre is not set. At this time, when determining that a child genre is set (step S51: YES), the system control unit 14 sets the genre ID of the selected child genre as an argument of the associated genre extraction processing (step S52). Then, the system control unit 14 performs the associated genre extraction processing (step S53).

When determining that the designation probability of the selected child genre is not the threshold β or more in step S48 (step S48: NO), when determining that a child genre is not set in step S51 (step S51: NO), or when the processing in step S53 is terminated, the system control unit 14 determines whether an unselected child genre is present in the child genres of the genre corresponding to the argument genre ID (step S54). At this time, when determining that an unselected child genre is present (step S54: YES), the system control unit 14 selects one of the unselected child genres (step S55). Then, the system control unit 14 proceeds to step S48. On the other hand, when determining that all the child genres are selected (step S54: NO), the system control unit 14 terminates the associated genre extraction processing.

Figure 11:
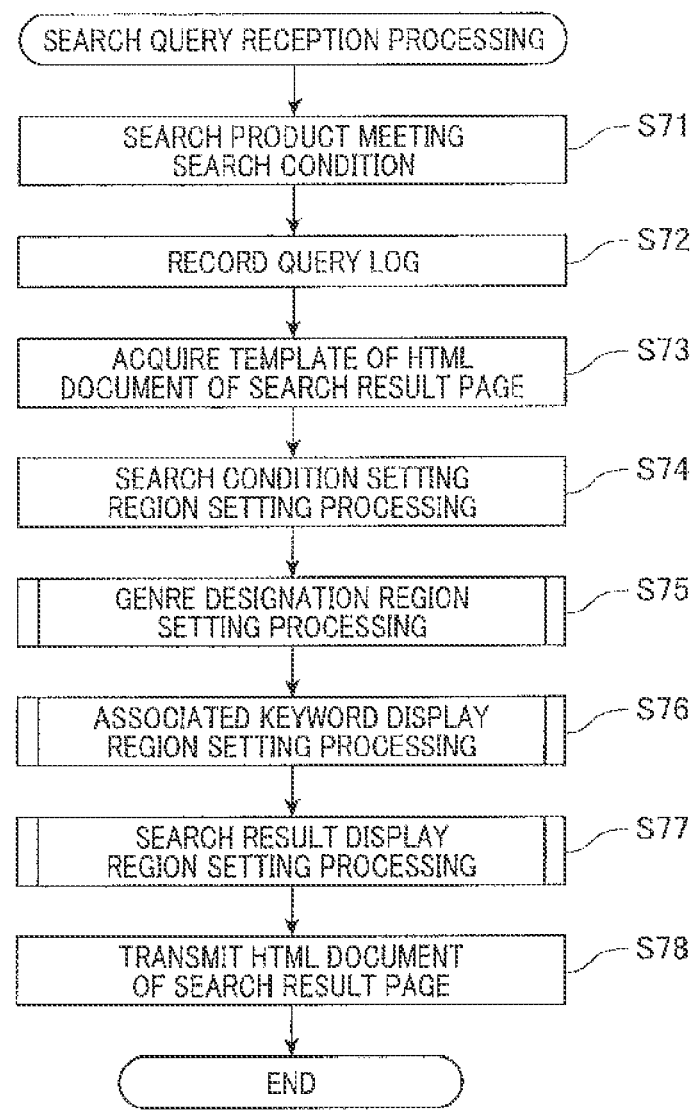
FIG. 11 is a flowchart illustrating exemplary processings in a search query reception processing of the system control unit 14 in the electronic mall server 1 according to the embodiment.

FIG. 11 is a flowchart illustrating exemplary processings in a search query reception processing of the system control unit 14 in the electronic mall server 1 according to the present embodiment. The search query reception processing is started when the electronic mall server 1 as a keyword acquisition means receives a search query from the user terminal 2 displaying the top page of the electronic mall or a search result page.

At first, the system control unit 14 searches a product meeting a search condition designated by the user (step S71). Specifically, when a search keyword is set in the search query, the system control unit 14 searches product information containing the search keyword in at least one of the product name and the product explanation from the product information DB 12b. When a genre ID is set in the search query, the system control unit 14 searches the product information of the product belonging to the genre corresponding to the genre ID from the product information DB 12b based on the genre ID contained in the product information. When the search keyword and the genre ID are set in the search query, the system control unit 14 searches the product information which contains the search keyword in at least one of the product name and the product explanation and belongs to the genre corresponding to the genre ID.

Then, the system control unit 14 records a query log (step S72). Specifically, the system control unit 14 acquires present time/date as reception time/date. Then, the system control unit 14 generates a query log containing the reception time/date, the search keyword and genre ID set in the search query. At this time, when the user requesting to search is logging in, the system control unit 14 contains sex, age and prefecture in the query log. For example, the system control unit 14 receives the user ID from the user terminal 2 and stores the received user ID as a cookie in the user terminal 2 when the user logs in the electronic mall. Thus, when the user is logging in, the search query is added with the cookie containing the user ID. Therefore, the system control unit 14 acquires the user ID from the cookie added to the search query. The system control unit 14 acquires member information corresponding to the user ID from the member information DB 12a. Then, the system control unit 14 specifies sex, age and prefecture based on the member information. The system control unit 14 registers the generated query log in the query log DB 12f.

Then, the system control unit 14 acquires a template of HTML document of a search result page from the storage unit 12 (step S73). Then, the system control unit 14 performs a search condition setting region setting processing (step S74). Specifically, the system control unit 14 sets the genre ID in the acquired template such that when the genre ID is set in the search query, the genre ID is transmitted together with the search keyword input in the keyword input column 211 when the search button 212 in the search result page is selected.

Then, the system control unit 14 performs a genre designation region setting processing (step S75). In the genre designation region setting processing, data for displaying a genre link 221 in the genre designation region 220 in the search result page is set in the acquired template. Then, the system control unit 14 performs an associated keyword display region setting processing (step S76). In the associated keyword display region setting processing, data for displaying an associated keyword link 231 in the associated keyword display region 230 in the search result page is set in the acquired template. Then, the system control unit 14 performs a search result display region setting processing (step S77). In the search result display region setting processing, data for displaying relevant product information 241 in the search result display region 240 in the search result page is set in the acquired template. Further, the genre designation region setting processing, the associated keyword display region setting processing and the search result display region setting processing will be described below in detail.

Then, the system control unit 14 transmits the HTML document of the search result page completed by setting each item of information to the user terminal 2 which is the transmission source of the search query (step S78). When terminating this processing, the system control unit 14 terminates the search query reception processing.

Figure 12:
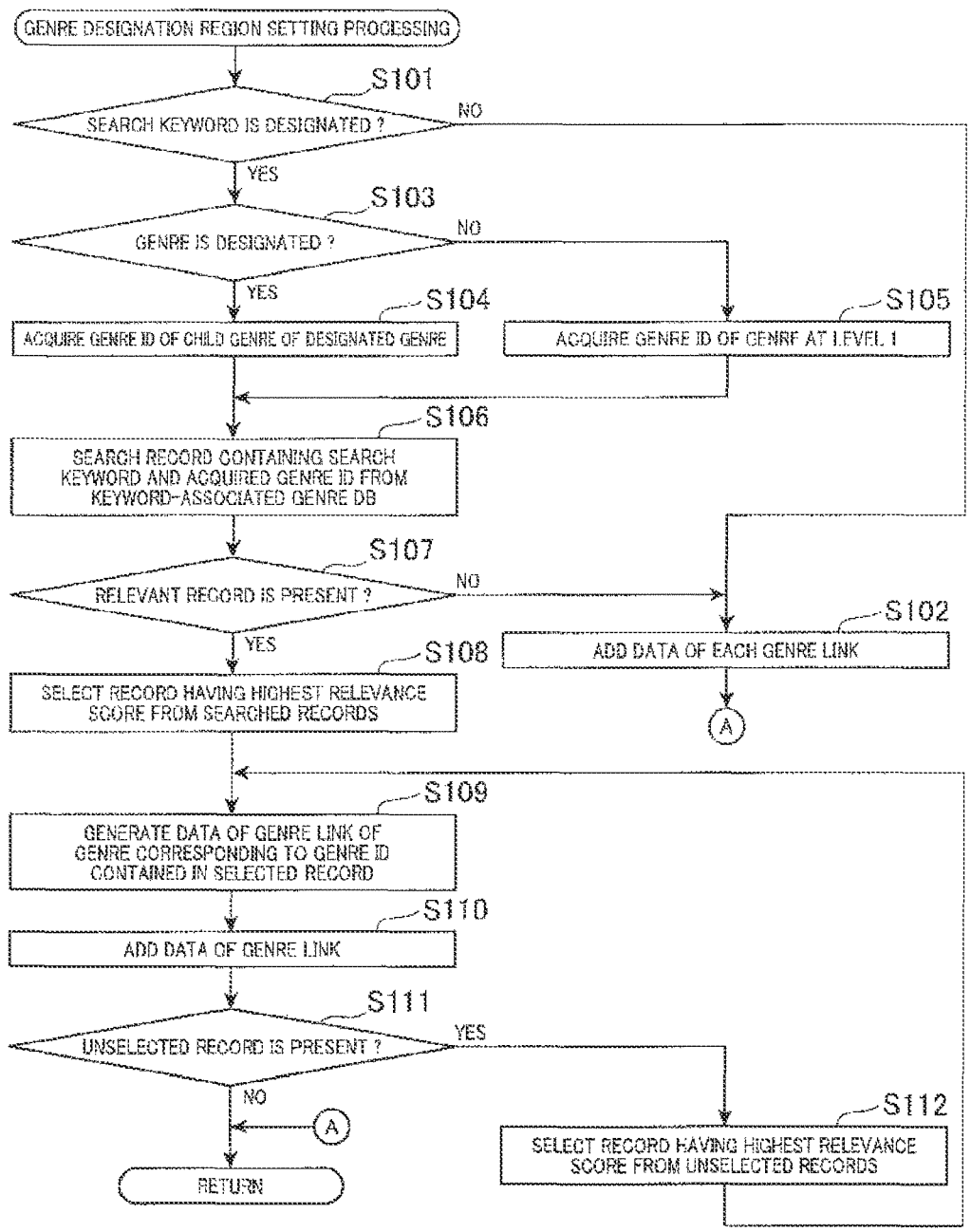
FIG. 12 is a flowchart illustrating exemplary processings in a genre designation region setting processing of the system control unit 14 in the electronic mall server 1 according to the embodiment.

FIG. 12 is a flowchart illustrating exemplary processings in the genre designation region setting processing of the system control unit 14 in the electronic mall server 1 according to the present embodiment.

At first, the system control unit 14 determines whether a search keyword is designated as a search condition (step S101). That is, the system control unit 14 determines whether a search keyword is set in the search query. At this time, when determining that a search keyword is not designated (step S101: NO), the system control unit 14 performs a normal processing of displaying a genre link 221 (step S102). Specifically, when a genre ID is not set in the search query, the system control unit 14 generates data for a genre link 221 for each genre at level 1. On the other hand, when the genre ID is set in the search query, the system control unit 14 generates data for a genre link 221 for each child genre of the genre corresponding to the genre ID. When generating the data for a genre link 221, the system control unit 14 sets URL for product search in the href attribute of <a> tag. Herein, the system control unit 14 adds the genre ID of the corresponding genre to URL indicating the transmission destination of the search query and generates URL for product search. The system control unit 14 sets the genre name of the corresponding genre between the start tag and the end tag of the <a> tag. The system control unit 14 additionally sets the generated data for a genre link 221 in a region corresponding to the genre designation region 220 in the acquired template. When terminating this processing, the system control unit 14 terminates the genre designation region setting processing.

On the other hand, when determining that a search keyword is designated (step S101: YES), the system control unit 14 determines whether a genre is designated as a search condition (step S103). That is, the system control unit 14 determines whether the genre ID is set in the search query. Herein, the genre corresponding to the genre ID set in the search query is called "designated genre." At this time, when determining that a genre is designated (step S103: YES), the system control unit 14 acquires a child genre ID list from the genre information corresponding to the genre ID of the designated genre among the genre information registered in the genre information DB 12c (step S104). On the other hand, when determining that a genre is not designated (step S103: NO), the system control unit 14 acquires a child genre ID list from the genre information of the genre top (step S105). That is, the system control unit 14 acquires a list of genre IDs of the genres at level 1.

When terminating the processing in step S104 or S105, the system control unit 14 searches a record containing the genre ID registered in the acquired child genre ID list among the records containing the search keyword from the keyword-associated genre DB 12h (step S106). Specifically, the system control unit 14 acquires one genre ID from the child genre ID list. Then, the system control unit 14 searches a record containing the acquired genre ID and the search keyword. The system control unit 14 performs the processing on all the genre IDs registered in the child genre ID list.

Then, the system control unit 14 determines whether a relevant record is present as a result of the searching in step S106 (step S107). At this time, when determining that a relevant record is not present (step S107: NO), the system control unit 14 proceeds to step S102. This is a case that a genre having a high degree of relevance with the search keyword designated by the user is not present.

On the other hand, when determining that a relevant record is present (step S107: YES), the system control unit 14 selects a record having the highest relevance score from among the searched records (step S108). Then, the system control unit 14 generates data for a genre link 221 of the genre corresponding to the genre ID contained in the selected record (step S109). The generation method is the same as the method described in step S102. However, when generating URL for product search, the system control unit 14 generates URL indicating the transmission destination of the search query added with the genre ID of the corresponding genre and the search keyword. Then, the system control unit 14 additionally sets the generated data for a genre link 221 of the genre in a region corresponding to the genre designation region 220 in the acquired template (step S110).

Then, the system control unit 14 determines whether an unselected record is present in the searched records (step S111). At this time, when determining that an unselected record is present (step S111: YES), the system control unit 14 selects one record having the highest relevance score from among the unselected records (step S112). Then, the system control unit 14 proceeds to step S109. The system control unit 14 repeats the processings in steps S109 to S112, and as a display order determination means, determines a display order of the genre links 221 of the genre having a high degree of relevance with the search keyword based on the relevance scores. That is, the system control unit 14 preferentially displays a genre link 221 whose genre has a higher relevance score. Then, when determining that all the records are selected (step S111: NO), the system control unit 14 terminates the genre designation region setting processing.

Figure 13:
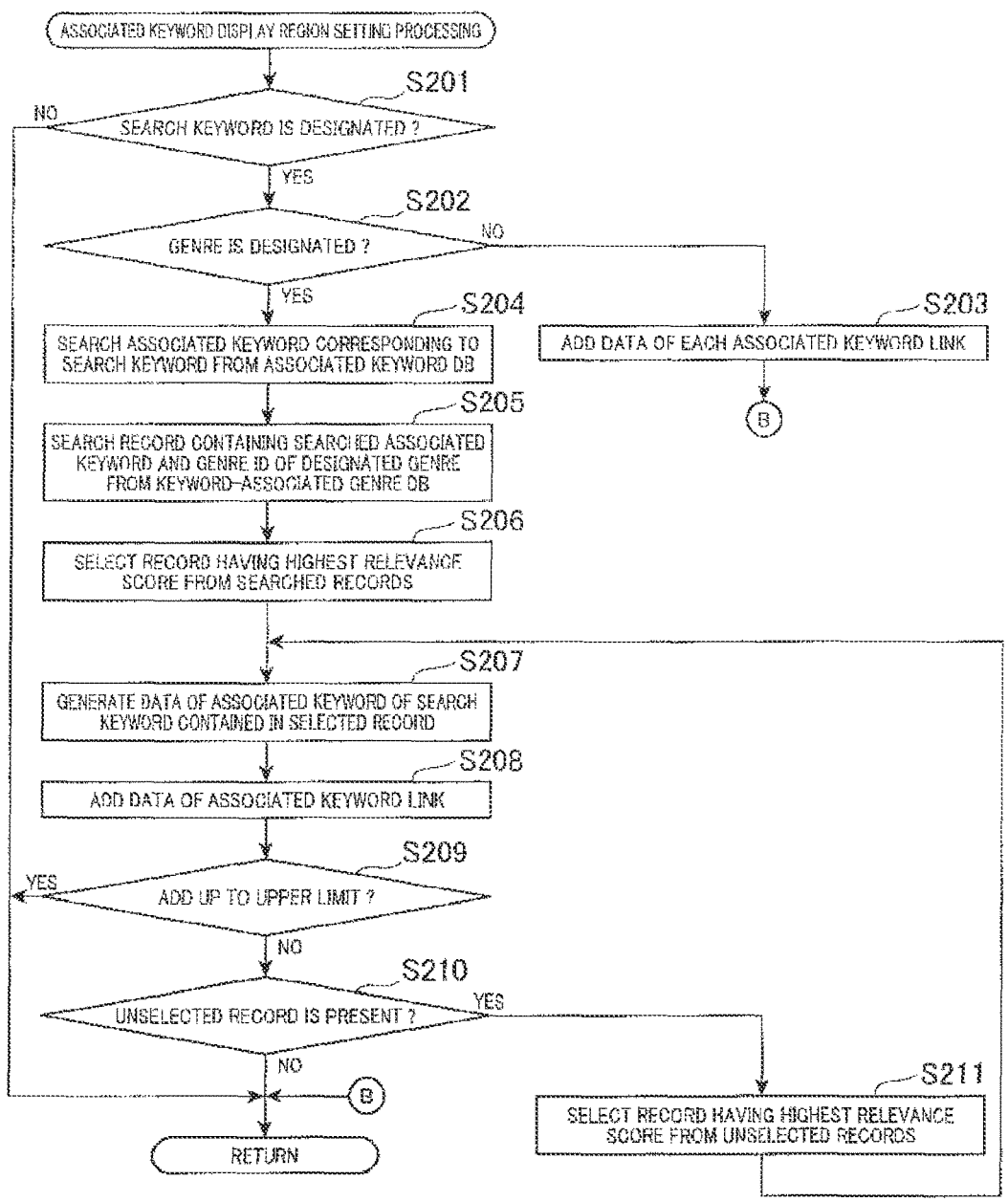
FIG. 13 is a flowchart illustrating exemplary processings in an associated keyword display region setting processing of the system control unit 14 in the electronic mall server 1 according to the embodiment.

FIG. 13 is a flowchart illustrating exemplary processings in an associated keyword display region setting processing of the system control unit 14 in the electronic mall server 1 according to the present embodiment.

At first, the system control unit 14 determines whether a search keyword is set as a search condition (step S201). At this time, when determining that a search keyword is not designated (step S201: NO), the system control unit 14 terminates the associated keyword display region setting processing. On the other hand, when determining that a search keyword is designated (step S201: YES), the system control unit 14 determines whether a genre is set as a search condition (step S202).

At this time, when determining that a genre is not designated (step S202: NO), the system control unit 14 performs a normal processing of displaying an associated keyword link 231 (step S203). Specifically, the system control unit 14 searches an associated keyword corresponding to the search keyword from the associated keyword DB 12e. Then, the system control unit 14 generates data for an associated keyword link 231 of the searched associated keyword. At this time, the system control unit 14 sets URL for product search in the href attribute of <a> tag. Herein, the system control unit 14 adds an associated keyword to URL indicating the transmission destination of the search query and generates URL for product search. Further, the system control unit 14 sets the associated keyword between the start tag and the end tag of the <a> tag. The system control unit 14 additionally sets the generated data for an associated keyword link 231 in a region corresponding to the associated keyword display region 230 in the acquired template. When terminating the processing, the system control unit 14 terminates the associated keyword display region setting processing.

When determining that a genre is designated (step S202: YES), the system control unit 14 searches an associated keyword corresponding to the search keyword from the associated keyword DB 12e (step S204). Then, the system control unit 14 searches a record containing the same search keyword as the associated keyword and the genre ID of the designated genre from the keyword-associated genre DB 12h per searched associated keyword (step S205).

Then, the system control unit 14 selects a record having the highest relevance score from among the searched records (step S206). Then, the system control unit 14 generates data for an associated keyword link 231 of the associated keyword contained as the search keyword in the selected record (step S207). The generation method is the same as the method described in step S203. However, when generating URL for product search, the system control unit 14 generates URL indicating the transmission destination of the search query added with the associated keyword and the genre ID of the designated genre. Then, the system control unit 14 additionally sets the generated data for an associated keyword link 231 in a region corresponding to the associated keyword display region 230 in the acquired template (step S208).

Then, the system control unit 14 determines whether the data for an associated keyword link 231 is added up to the upper limit number of displayable associated keyword links 231 (step S209). At this time, when determining that the data is added up to the upper limit (step S209: YES), the system control unit 14 terminates the associated keyword display region setting processing. On the other hand, when determining that the data is not added up to the upper limit (step S209: NO), the system control unit 14 determines whether an unselected record is present in the searched records (step S210). At this time, when determining that an unselected record is present (step S210: YES), the system control unit 14 selects one record having the highest relevance score from among the unselected records (step S211). Then, the system control unit 14 proceeds to step S207. The system control unit 14 repeats the processings in step S207 to S211, thereby determining a display order of the associated keyword links 231 of the associated keyword of the search keyword, the associated keyword having a high degree of relevance with the designated genre, based on the relevance scores. That is, the system control unit 14 preferentially displays an associated keyword link 231 of an associated keyword having a higher relevance score. Then, when determining that all the records are selected (step S210: NO), the system control unit 14 terminates the associated keyword display region setting processing.

Figure 14:
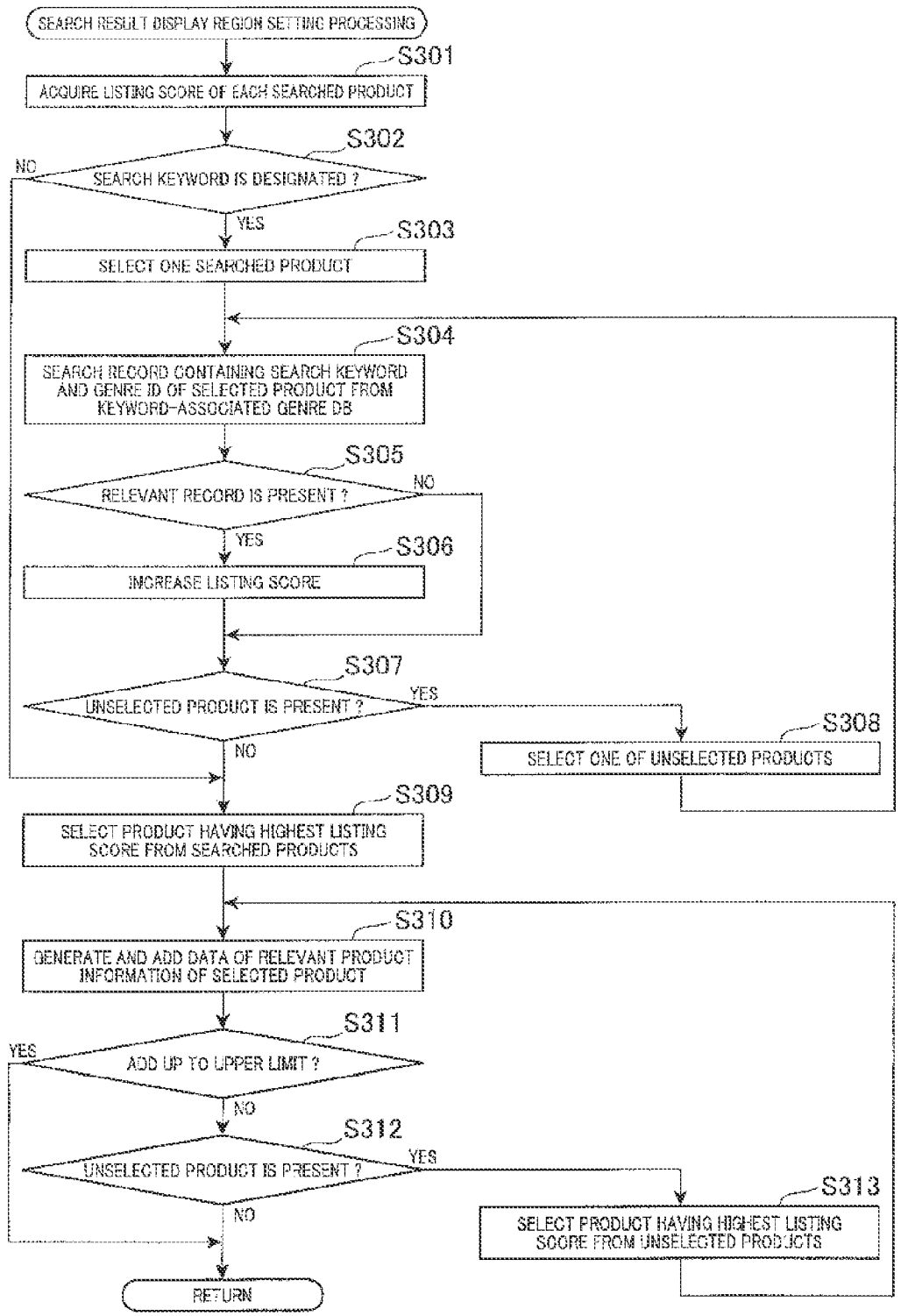
FIG. 14 is a flowchart illustrating exemplary processings in a search result display region setting processing of the system control unit 14 in the electronic mall server 1 according to the embodiment.

FIG. 14 is a flowchart illustrating exemplary processings in the search result display region setting processing of the system control unit 14 in the electronic mall server 1 according to the present embodiment.

At first, the system control unit 14 as an evaluation value acquisition means acquires a listing score of each product searched in step S71 in the search query reception processing via API of the product evaluation program, for example (step S301). Then, the system control unit 14 determines whether a search keyword is designated as a search condition (step S302). At this time, when determining that a search keyword is designated (step S302: YES), the system control unit 14 selects one of the searched products (step S303). Herein, the selected product is called "selected product."

Then, the system control unit 14 acquires the genre ID of a child genre to which the selected product belongs from among the child genres of the designated genre. The genre to which the selected product belongs is the same genre as the genre corresponding to the genre ID contained in the product information of the selected product, or a genre corresponding to the genre ID contained in the product information of the selected product in descendent genres. Then, the system control unit 14 searches a record containing the search keyword and the acquired genre ID from the keyword-associated genre DB 12h (step S304). Then, the system control unit 14 determines whether a relevant record is present as a result of the searching (step S305). At this time, when determining that a relevant record is present (step S305: YES), the system control unit 14 as an evaluation value change means increases the listing score of the selected product (step S306). For example, the system control unit 14 may add a previously-set value to the listing score or may multiply the listing score by a previously-set coefficient. The system control unit 14 may further increase the listing score as the relevance score contained in the searched record is higher.

When determining that a relevant record is not present in step S305 (step S305: NO), or when the processing in step S306 is terminated, the system control unit 14 determines whether an unselected product is present among the searched products (step S307). At this time, when determining that an unselected product is present (step S307: YES), the system control unit 14 selects one of the unselected products (step S308). Then, the system control unit 14 proceeds to step S304. The system control unit 14 repeats the processings in step S304 to S308, thereby increasing the listing score of a product having a high degree of relevance with the search keyword among the searched products.

When determining that a search keyword is not designated in step S302 (step S302: NO), or when determining that all the products are selected (step S307: NO), the system control unit 14 selects a product having the highest listing score from among the searched products (step S309). Then, the system control unit 14 generates data for relevant product information 241 based on the product information on the selected product. Then, the system control unit 14 additionally sets the generated data in a region corresponding to the search result display region 240 in the acquired template (step S310).

Then, the system control unit 14 determines whether the data for relevant product information 241 is added up to the upper limit of displayable relevant product information 241 (step S311). At this time, when determining that the data is added up to the upper limit (step S311: YES), the system control unit 14 terminates the search result display region setting processing. On the other hand, when determining that the data is not added up to the upper limit (step S311: NO), the system control unit 14 determines whether an unselected product is present in the searched products (step S312). At this time, when determining that an unselected product is present (step S312: YES), the system control unit 14 selects one product having the highest listing score from among the unselected products (step S313). Then, the system control unit 14 proceeds to step S310. The system control unit 14 repeats the processings in steps S310 to S313, thereby preferentially displaying the relevant product information 241 of a product having a higher listing score. Then, when determining that all the products are selected (step S312: NO), the system control unit 14 terminates the search result display region setting processing.

The user terminal 2 receiving the HTML document of the search result page from the electronic mall server 1 displays the search result page on the screen based on the HTML document. At this time, the CPU of the user terminal 2 as a genre display means displays the genre links 221 in the genre designation region 220 in the data setting order based on the data for the genre links 221. Then, the CPU of the user terminal 2 displays the associated keyword links 231 in the associated keyword display region 230 in the data setting order based on the data for the associated keyword links 231. Then, the CPU of the user terminal 2 displays the relevant product information 241 in the search result display region 240 in the data setting order based on the data for the relevant product information 241.

FIG. 15 is a flowchart illustrating exemplary processings in a search keyword candidate request reception processing of the system control unit 14 in the electronic mall server 1 according to the present embodiment. Whenever the user performs an input operation in the keyword input column 211 in the search result page displayed by the user terminal 2, the user terminal 2 transmits a search keyword candidate request to the electronic mall server 1. The input operation includes adding a character in the keyword input column 211, deleting a character from the keyword input column 211, and the like. A character string input in the keyword input column 211 at the time of transmission is set in the search keyword candidate request. When a genre is designated as a search condition in a previous page, the genre ID of the genre is set in the search keyword candidate request. The search keyword candidate request reception processing is started when the electronic mall server 1 as a character string acquisition means receives the search keyword candidate request.

At first, the system control unit 14 determines whether the genre ID is set in the search keyword candidate request (step S401). At this time, when determining that the genre ID is not set (step S401: NO), the system control unit 14 searches a keyword matching in the left-hand part with the character string set in the search keyword candidate request from the keyword DB 12d. Then, the system control unit 14 transmits a list of searched keywords as search keyword candidates to the user terminal 2 (step S402). When terminating the processing, the system control unit 14 terminates the search keyword candidate request reception processing.

On the other hand, when determining that the genre ID is set (step S401: YES), the system control unit 14 searches a record containing a search keyword matching in the left-hand part with the character string set in the search keyword candidate request from the keyword-associated genre DB 12h (step S403). Then, the system control unit 14 extracts a record containing the genre ID set in the search keyword candidate request from the searched records (step S404). The system control unit 14 rearranges the extracted records in descending order of the relevance scores contained in the records. Then, the system control unit 14 acquires the search keywords from the extracted records in descending order of the relevance scores. At this time, the system control unit 14 acquires the upper limit number of keywords displayable in the search keyword candidate display region 213. Further, the system control unit 14 generates a list of search keywords acquired from the records in descending order of the relevance scores. In this way, the system control unit 14 as a keyword determination means determines a keyword to be displayed in the search keyword candidate display region 213 such that a search keyword having a high degree of relevance with the genre corresponding to the genre ID set in the search keyword candidate request is preferentially displayed among the search keywords matching in the left-hand part with the character string set in the search keyword candidate request. Then, the system control unit 14 transmits the generated list of keywords to the user terminal 2 (step S405). When terminating the processing, the system control unit 14 terminates the search keyword candidate request reception processing.

When receiving the list of keywords from the electronic mall server 1, the user terminal 2 displays the search keyword candidate display region 213 in the search result page. The CPU of the user terminal 2 as a keyword display means displays the keywords registered in the received list in the search keyword candidate display region 213 in a registration order and displays them as designatable search keywords.

As described above, according to the present embodiment, the system control unit 14 in the electronic mall server 1 acquires the number of times when each of a plurality of genres of the products is designated as a search condition together with a search keyword, and registers the genre ID indicating the genre for which the acquired number of times is a threshold or more, and the search keyword in an associated manner in the keyword-associated genre DB 12h. Thus, a keyword and a genre having a high degree of relevance with the keyword can be associated.

Further, the system control unit 14 registers when the entropy indicating a small degree of variation of the acquired number of times in the genres is a threshold or less. Thus, a genre which is designated more times than other genres can be associated with the keyword.

Further, when a plurality of child genres belonging to a genre are set for the genre indicated by the genre ID registered in association with a search keyword, the system control unit 14 as an acquisition means acquires the number of times when each of the child genres is designated as a search condition together with the search keyword, and registers the genre ID indicating the child genre for which the acquired number of times is a threshold or more, and the search keyword in an associated manner. Thus, the genres having a high degree of relevance with the keyword can be hierarchically associated.

Further, the system control unit 14 registers the genre ID of the genre for which the acquired number of times is equal to or more than a threshold determined depending on the number of genres, and the search keyword in an associated manner. Thus, a genre having a high degree of relevance with the keyword can be appropriately extracted depending on the number of genres.

Further, the system control unit 14 receives a search query from the user terminal 2, and determines, based on the relevance score depending on the acquired number of times, a genre display order by the user terminal 2 for displaying, in the genre designation region 220, a genre link 221 of a genre the genre ID of which is registered in the keyword-associated genre DB 12h in association with the search keyword contained in the search query among a plurality of genres. Thus, the user can easily search a genre to be designated as a search condition from the genre designation region 220.

Further, when receiving a character string input in the keyword input column 211 from the user terminal 2 together with the genre ID of a genre designated as a search condition, and determining a keyword to be displayed by the user terminal 2 for displaying a keyword containing the received character string in the search keyword candidate display region 213, the system control unit 14 determines to preferentially display a keyword registered in the keyword-associated genre DB 12h in association with the received genre ID. Thus, the user can easily designate a search keyword from the search keyword candidate display region 213.

Further, the system control unit 14 receives a search query from the user terminal 2, acquires a listing score of a product searched based on a search keyword contained in the search query, and increases the listing score of the product belonging to the genre indicated by the genre ID registered in the keyword-associated genre DB 12h in association with the search keyword among the searched products relative to the listing scores of other products. Thus, the user can easily search information on a product having a high degree of relevance with the keyword from the search result display region 240.

Then, the electronic mall server 1 may extract a pair of search keyword and genre having a high degree of relevance therebetween per attribute of the user designating the search conditions. This is because a trend to designate a pair of search keyword and genre as search conditions may be different depending on an attribute of the user. The user attributes are registered in the query log DB 12f, and thus the number of designations of the pair of search keyword and genre can be calculated per attribute of the user designating the search conditions. A pair is extracted per attribute since the display contents in the search result page need to be personalized.

Specifically, the system control unit 14 extracts a pair of search keyword, genre ID, sex, age and prefecture from the query logs in step S3 in the keyword/genre association processing illustrated in FIG. 9, for example. At this time, the system control unit 14 extracts only the search keyword and genre ID from the query logs in which sex, age and prefecture are not registered. Then, the system control unit 14 performs the processings in steps S4 to S19 as described above. That is, the system control unit 14 first extracts a pair of search keyword and genre having a high degree of relevance therebetween not in consideration of user attributes.

Then, the system control unit 14 performs basically the same processings as steps S4 to S19 per user attribute. By way of example, a case in which the processings are performed based on sex will be described. In step S4, the system control unit 14 extracts a pair with male from among the pairs acquired from the query log DB 12f. Then, the system control unit 14 calculates the number of times when each genre is designated as a search condition together with a search keyword based on the extracted pair among the pairs acquired from the query log DB 12*f* (step S4). Then, the number of times is registered in the keyword/genre list (step S5). Thereafter, the system control unit 14 performs steps S5 to S19. In step S50 in the associated genre extraction processing illustrated in FIG. 10, the system control unit 14 associates the selected keyword, the genre ID of the selected child genre, the relevance score and the attribute information indicating male and registers them as one record in the keyword-associated genre DB 12*h*. When terminating the processings for male, the system control unit 14 similarly performs the processings for female. This is applicable to a case in which a pair of search keyword and genre having a high degree of relevance therebetween is extracted per age or prefecture. A pair may be extracted not based on age but based on year, for example. For example, a pair of search keyword and genre having a high degree of relevance therebetween may be extracted per combination of attributes such as sex, age and prefecture. The user attributes are not limited to sex, age and prefecture.

When receiving a search query from the user terminal 2, the system control unit 14 determines whether the user requesting to search is logging in. This can be determined by confirming whether a cookie containing the user ID is added to the search query. When determining that the user is not logging in, the system control unit 14 performs the genre designation region setting processing, the associated keyword display region setting processing, and the search result display region setting processing as described above. Herein, when searching a record from the keyword-associated genre DB 12*h*, the system control unit 14 searches a record containing no attribute information. This is because when the user requesting to search is not logging in, a user attribute cannot be specified. Thus, the system control unit 14 performs the processings not in consideration of the user attributes.

On the other hand, when determining that the user is logging in, the system control unit 14 specifies user attributes. Then, when searching a record from the keyword-associated genre DB 12*h* in the genre designation region setting processing, the associated keyword display region setting processing and the search result display region setting processing, the system control unit 14 searches a record containing attribute information indicating the specified user attributes. Thereby, the display contents in the search result page can be adapted to the contents suitable for the attributes of the viewing user.

This is applicable to the search keyword candidate request reception processing. When the user is not logging in, the system control unit 14 searches a record containing no attribute information from the keyword-associated genre DB 12*h*, and when the user is logging in, searches a record containing attribute information indicating user attributes from the keyword-associated genre DB 12*h*.

Further, according to the present embodiment, the electronic mall server 1 extracts a pair of search keyword and genre having a high degree of relevance therebetween based on the number of times when the search keyword and the genre are designated as search conditions. However, the electronic mall server 1 may extract a pair of search keyword and genre having a high degree of relevance therebetween based on the number of times when a searched product is purchased (the number of times when order is established) based on the searching of the product under the search conditions, for the number of times when the search keyword and the genre are designated as search conditions. The number of times is called "number of designations with purchase condition." This is because a search keyword and a genre designated as search conditions have a higher degree of relevance therebetween when a product is purchased as a result of the searching under the search conditions than when the user only designates the search conditions.

Then, the storage unit 12 constructs a purchase history DB 12*i* therein. FIG. 16 is a figure illustrating exemplary contents registered in the purchase history DB 12*i*. The purchase history DB 12*i* registers product purchase history by the user therein. Specifically, the purchase history DB 12*i* registers therein order code, purchase time/date, user ID, product ID, shop ID, product code, sex, age, prefecture, search keyword, search genre ID and the like in an associated manner per product purchase. The order code is order identification information given every product order. The user ID indicates a user who purchases. The product ID and the product code indicate a purchased product. The shop ID indicates a shop where the product is purchased. Sex, age and prefecture are attributes of the user who purchases. The search keyword and the search genre ID are a search keyword and a genre ID designated as search conditions.

For example, when transmitting the HTML document of the search result page to the user terminal 2 in response to the search query received from the user terminal 2, the system control unit 14 transmits a cookie containing the search keyword and genre ID contained in the search query to the user terminal 2. Thereby, the system control unit 14 can receive a search keyword and a genre ID last designated as search conditions as a cookie from the user terminal 2. The user selects any relevant product information 241 from the search result display region 240 in the search result page, and thus the product page is displayed on the screen of the user terminal 2. The user performs a purchase operation in the product page so that the user terminal 2 transmits a purchase request to the electronic mall server 1. When receiving the purchase request, the system control unit 14 registers a purchase history. At this time, the system control unit 14 acquires present time/date as purchase time/date. Further, the system control unit 14 acquires sex, age and prefecture of the user. Further, the system control unit 14 acquires the search keyword and the genre ID from the cookie added to the purchase request. Then, the system control unit 14 registers the purchase history containing the acquired information in the purchase history DB 12*i*.

The system control unit 14 acquires a pair of search keyword and search genre ID from the purchase history registered in the purchase history DB 12*i* in step S3 of the keyword/genre association processing illustrated in FIG. 9, for example. Thereafter, the system control unit 14 performs steps S4 to S19 and the associated genre extraction processing as described above. At this time, the system control unit 14 may perform the processings based on the number of designations with purchase condition instead of the number of designations.

Further, the above embodiment is such that when a genre link 221 of a genre having a high degree of relevance with a search keyword is displayed in the genre designation region 220, only a genre link 221 of a genre at one level is displayed. However, genre links 221 of genres at several levels may be displayed.

Figure 17:
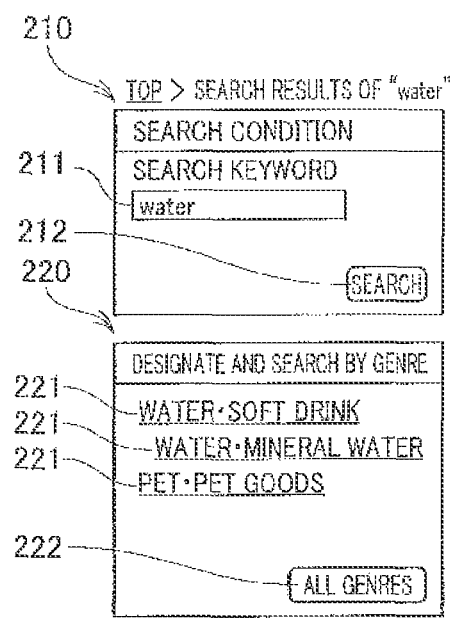
FIG. 17 is a figure illustrating exemplary display of genre links 221 in the genre designation region 220.

FIG. 17 is a figure illustrating exemplary display of genre links 221 in the genre designation region 220. For example, as described with reference to FIG. 3(*a*), the user designates a search keyword "water" in the top page. Then, as illustrated in FIG. 17, "WATER•SOFT DRINK" and "PET•PET GOODS" as the genre links 221 among the genres at level 1 are displayed, and "WATER•MINERAL WATER" as the genre link 221, which is a child genre of "WATER•SOFT DRINK", is displayed. At this time, the genre links 221 are displayed in a form in which it can be seen that "WATER•SOFT DRINK" and "WATER•MINERAL WATER" are in a parent/child relationship. In this way, a genre link 221 of a genre at a deeper level is displayed as a genre associated with the search keyword, and thus the user can easily search a desired genre.

When searching a record of a genre having a high degree of relevance with the search keyword from a keyword-associated genre DB 12h in steps S104 to S106 in the genre designation region setting processing illustrated in FIG. 12, the system control unit 14 searches a record of a genre having a high degree of relevance based on depth-first searching from the child genres of the designated genre or the genres at level 1. That is, when a record containing the search keyword and the certain genre ID contained in the acquired child genre ID list is registered in the keyword-associated genre DB 12h, the system control unit 14 next acquires a child genre ID list contained in the genre information corresponding to the genre ID. Then, the system control unit 14 searches a record containing the genre ID registered in the acquired child genre ID list from among the records containing the search keyword. The system control unit 14 adds data for a genre link 221 to each searched record.

Further, whenever the user performs an input operation in the keyword input column 211 in the search result page, the display of the genre links 221 in the genre designation region 220 may dynamically change depending on a character string input in the keyword input column 211. Specifically, a genre link 221 of a genre associated with a search keyword containing the input character string may be displayed. For example, when receiving a search keyword candidate request from the user terminal 2, the system control unit 14 searches a record containing a search keyword matching in the left-hand part with the character string set in the search keyword candidate request from the keyword-associated genre DB 12h. At this time, when a genre ID is set in the search keyword candidate request, the system control unit 14 searches a record containing the genre ID. On the other hand, when a genre ID is not set in the search keyword candidate request, the system control unit 14 searches a record containing the genre ID at level 1. The system control unit 14 adds data for a genre link 221 to each searched record.

Further, in the above embodiment, the electronic mall server 1 records query logs and calculates the number of designations based on the query logs. However, the electronic mall server 1 may calculate the number of designations in another way without recording a query log. For example, when receiving a search query containing a search keyword and a genre ID from the user terminal 2, the system control unit 14 determines whether the search keyword and the genre ID are registered in the designation frequency information DB 12g. At this time, when determining that they are not registered, the system control unit 14 registers a pair of search keyword, genre ID, which are contained in the search query, and number of designations in the designation frequency information DB 12g. At this time, the system control unit 14 assumes the number of designations at 1. On the other hand, when determining that they are registered, the system control unit 14 adds 1 to the number of designations corresponding to the search keyword and the genre ID contained in the search query in the designation frequency information DB 12g.

Further, the genres are hierarchically defined in the above embodiment, but may not be hierarchically defined. Only one hierarchy of genres may be possible.

Further, the categories of the present invention are applied to the genres in the above embodiment. However, the categories of the present invention may be applied to category, price range, region and the like.

Further, in the above embodiment, the present invention is applied to searching a product. However, the present invention may be applied to searching service, Web page, image, movie, voice, map, news, blogs and the like, for example.

DESCRIPTION OF REFERENCE NUMERALS

1: Electronic mall server
2: User terminal
11: Communication unit
12: Storage unit
12a: Member information DB
12b: Product information DB
12c: Genre information DB
12d: Keyword DB
12e: Associated keyword DB
12f: Query log DB
12g: Designation frequency information DB
12h: Keyword-associated genre information DB
13: I/O interface
14: System control unit
14a: CPU
14b: ROM
14c: RAM
15: System bus
NW: Network
S: Shopping system

The invention claimed is:

1. An association apparatus comprising:
at least one memory operable to store computer program code;
at least one processor operable to access said at least one memory and operate as instructed by said program code, wherein said program code including:
  acquisition code that causes at least one of said at least one processor to acquire a designation probability at which each of a plurality of categories of a search target is designated as a search condition together with a certain keyword;
  registration code that causes at least one of said at least one processor to:
    determine whether a variation in the designation probability of a certain category, whit respect to respective designation probabilities of the plurality of categories, exceeds a first threshold, and
    in response to determining that the variation exceeds the first threshold, register category information indicating the certain category in association with the certain keyword, the designation probability of the certain category being a second threshold or more,
  keyword acquisition code that cause at least one of said at least one processor to acquire a keyword designated as a search condition; and
  display order determination code that causes at least one of said at least one processor to determine, based on the designation probability acquired by the acquisition code, a display order of the category to be displayed in association with a keyword acquired by the keyword acquisition code, from among the plurality of categories, in a form selectable by a user.

2. The association apparatus according to claim 1, wherein when a plurality of sub-categories are set as the categories belonging to the category indicated by the category information registered by the registration code in association with the certain keyword, the acquisition code causes at least one of said at least one processor to acquire the designation probability at which each of the plurality of sub-categories is designated as a search condition together with the certain keyword, and the registration code causes at least one of said at least one processor to register category information indicating the sub-category in association with the certain keyword, the acquired designation probability for the sub-category indicated by the registered category information being a second threshold or more.

3. The association apparatus according to claim 1, wherein the registration code causes at least one of said at least one processor to register the category information of the category in association with the certain keyword, the designation probability acquired by the acquisition code for the category indicated by the registered category information being the second threshold or more, the second threshold being determined depending on a number of categories.

4. The association apparatus according to claim 3, wherein the search target is a transaction target to be dealt in a commercial transaction, and
the acquisition code causes at least one of said at least one processor to acquire the designation probability, at which each of the plurality of categories of the search target is designated as the search condition together with the certain keyword and deal of the transaction target is completed based on the transaction target searched under the search condition.

5. The association apparatus according to claim 3, wherein the acquisition code causes at least one of said at least one processor to acquire a designation probability, at which each of the plurality of categories is designated together with the certain keyword per attribute information of a user who designates, and
the registration code causes at least one of said at least one processor to register the category information indicating the category and the attribute information in association with the certain keyword, the designation probability acquired by the acquisition code for the category indicated by the registered category information being the second threshold or more.

6. The association apparatus according to claim 3, further comprising:
character string acquisition code that causes at least one of said at least one processor to acquire a character string input in a keyword input column as a search condition together with the category information of the category designated as a search condition; and
keyword determination code that causes at least one of said at least one processor to determine a keyword displayed by a keyword display code that causes at least one of said at least one processor to display a keyword containing a character string acquired by the character string acquisition code as a search condition in a form that is selectable by a user, and control such that a keyword registered by the registration code in association with the category information acquired by the character string acquisition code is firstly displayed than other keywords.

7. The association apparatus according to claim 3, further comprising:
evaluation value acquisition code that causes at least one of said at least one processor to acquire an evaluation value for determining a display order as a search result, the evaluation value being of a search target searched based on a keyword acquired by the keyword acquisition code; and
evaluation value change code that causes at least one of said at least one processor to increase the evaluation value of a search target belonging to the category indicated by the category information registered by the registration code in association with a keyword acquired by the keyword acquisition code among the searched search targets relative to the evaluation value of other search target.

8. The association apparatus according to claim 1, wherein the search target is a transaction target to be dealt in a commercial transaction, and
the acquisition code causes at least one of said at least one processor to acquire the designation probability, at which each of the plurality of categories of the search target is designated as the search condition together with the certain keyword and a deal of the transaction target is completed based on the transaction target searched under the search condition.

9. The association apparatus according to claim 1, wherein the acquisition code causes at least one of said at least one processor to acquire a designation probability, at which each of the plurality of categories is designated together with the certain keyword per attribute information of a user who designates, and
the registration code causes at least one of said at least one processor to register the category information indicating the category and the attribute information in association with the certain keyword, the designation probability acquired by the acquisition code for the category indicated by the registered category information being a threshold or more.

10. The association apparatus according to claim 1, further comprising:
character string acquisition code that causes at least one of said at least one processor to acquire a character string input in a keyword input column as a search condition together with the category information of the category designated as a search condition; and
keyword determination code that causes at least one of said at least one processor to determine a keyword displayed by keyword display code that causes at least one of said at least one processor to display a keyword containing a character string acquired by the character string acquisition code as a search condition in a form that is selectable by a user, and control such that a keyword registered by the registration code in association with the category information acquired by the character string acquisition code is firstly displayed than other keywords.

11. The association apparatus according to claim 1, further comprising:
evaluation value acquisition code that causes at least one of said at least one processor to acquire an evaluation value for determining a display order as a search result, the evaluation value being of a search target searched based on a keyword acquired by the keyword acquisition code; and evaluation value change code that causes at least one of said at least one processor to increase the evaluation value of a search target belonging to the category indicated by the category information registered by the registration code in association with a keyword acquired by the keyword acquisition code among the searched search targets relative to the evaluation value of other search target.

12. An association method performed by a computer, comprising:

acquiring a designation probability at which each of a plurality of categories of a search target is designated as a search condition together with a certain keyword;

determining whether a variation in the designation probability of a certain category, with respect to respective designation probabilities of the plurality of categories, exceeds a first threshold, and in response to determining that the variation exceeds the first threshold, register category information indicating the certain category in association with the certain keyword, the designated probability of the certain category being a second threshold or more, acquiring a keyword designated as a search condition; and determining, based on the designation probability, a display order of the category to be displayed in association with the acquired keyword, from among the plurality of categories, in a form selectable by a user.

* * * * *